(12) United States Patent
Yoon et al.

(10) Patent No.: US 7,129,105 B2
(45) Date of Patent: Oct. 31, 2006

(54) METHOD FOR MANUFACTURING THIN FILM TRANSISTOR ARRAY PANEL FOR DISPLAY DEVICE

(75) Inventors: Joo-Sun Yoon, Seoul (KR); Bong-Ju Kim, Suwon (KR); Seung-Gyu Tae, Suwon (KR); Hyun-Young Kim, Goyang (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/509,481

(22) PCT Filed: Sep. 18, 2002

(86) PCT No.: PCT/KR02/01773

§ 371 (c)(1),
(2), (4) Date: Mar. 23, 2005

(87) PCT Pub. No.: WO03/085448

PCT Pub. Date: Oct. 16, 2003

(65) Prior Publication Data

US 2005/0170548 A1    Aug. 4, 2005

(30) Foreign Application Priority Data

Apr. 4, 2002 (KR) ............................. 2002-18506

(51) Int. Cl.
*H01L 21/00* (2006.01)
*H01L 21/84* (2006.01)

(52) U.S. Cl. ........................................ 438/30; 438/158
(58) Field of Classification Search ............... 438/30, 438/158–160, 780, 597–689
See application file for complete search history.

(56) References Cited

U.S. PATENT DOCUMENTS

| | | | |
|---|---|---|---|
| 5,548,424 A | | 8/1996 | Takao et al. |
| 5,548,425 A * | | 8/1996 | Adachi et al. ............... 349/112 |
| 5,652,159 A * | | 7/1997 | Hirano ....................... 438/160 |
| 5,706,064 A | | 1/1998 | Fukunaga et al. |
| 5,767,827 A * | | 6/1998 | Kobayashi et al. ........... 345/87 |
| 6,136,625 A * | | 10/2000 | Nakazawa ................... 438/30 |
| 6,156,583 A * | | 12/2000 | Hwang ........................ 438/30 |
| 6,159,779 A * | | 12/2000 | Huang et al. ............... 438/158 |
| 6,184,070 B1 * | | 2/2001 | Park ........................... 438/159 |
| 6,188,452 B1 * | | 2/2001 | Kim et al. .................... 349/43 |

FOREIGN PATENT DOCUMENTS

| | | |
|---|---|---|
| JP | 01-100518 | 4/1989 |
| JP | 05-203988 | 8/1993 |

OTHER PUBLICATIONS

Patent Abstracts of Japan, Publication No. 01-100518, Apr. 18, 1989, 1 page.
Patent Abstracts of Japan, Publication No. 05-203988, Aug. 13, 1993, 1 page.

* cited by examiner

*Primary Examiner*—Michael Lebentritt
*Assistant Examiner*—Elias Ullah
(74) *Attorney, Agent, or Firm*—MacPherson Kwok Chen & Heid LLP

(57) ABSTRACT

A gate wire including gate lines, gate electrodes, and gate pads and extending in a transverse direction is formed on a substrate. A gate insulating layer is formed thereafter, and a semiconductor layer and an ohmic contact layer are sequentially formed thereon. A conductive material is deposited and patterned to form a data wire inducing data lines intersecting the gate lines, source electrodes, drain electrodes, and data pads. A protective layer made of silicon nitride is deposited on the substrate, and an organic insulating layer made of a photosensitive organic insulating material is coated on the protective layer. The organic insulating layer is patterned to form an unevenness pattern on its surface and first contact holes exposing the protective layer opposite the drain electrodes. Subsequently, the surface of the organic insulating layer is treated using inactive gas such as Ar, and then the protective layer is patterned together with the gate insulating layer by photo etch using a photoresist pattern to form contact holes respectively exposing the drain electrodes, the gate pads, and the data pads. Next, indium-tin-oxide or indium-zinc-oxide is deposited and patterned to form transparent electrodes, subsidiary gate pads, and subsidiary data pads respectively connected to the drain electrodes, the gate pads and the data pads. Finally, a reflective conductive material is deposited and patterned to form reflecting films having respective apertures in the pixel area on the transparent electrodes.

7 Claims, 40 Drawing Sheets

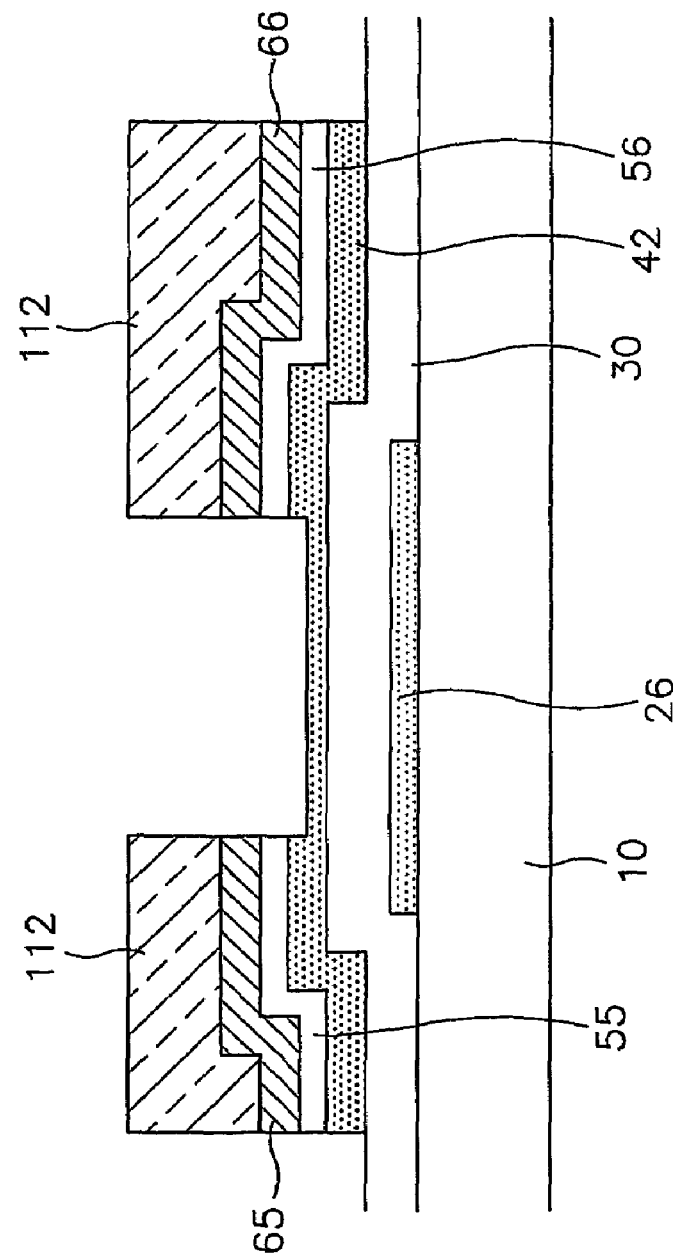

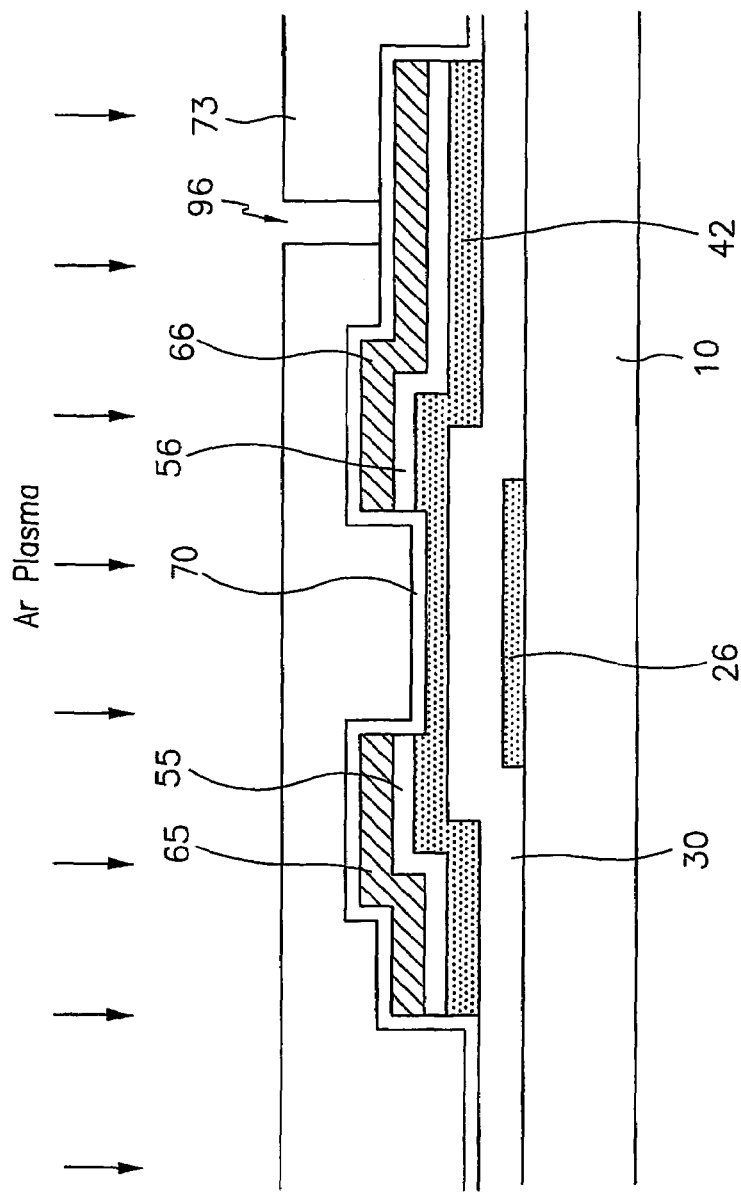

METHOD FOR MANUFACTURING THIN FILM TRANSISTOR ARRAY PANEL FOR DISPLAY DEVICE

BACKGROUND OF THE INVENTION (a) Field of the Invention

The present invention relates to a manufacturing method of a thin film transistor array panel for a display device.

(b) Description of the Related Art

At present, a liquid crystal display ("LCD") is one of the most widely used flat panel displays. An LCD, which includes two panels having electrodes and a liquid crystal layer interposed therebetween, controls the transmittance of light passing through the liquid crystal layer by realigning liquid crystal molecules in the liquid crystal layer with voltages applied to the electrodes. Among these LCDs, the most commonly used one provides at least one electrode on each panel and includes thin film transistors ("TFTs") switching the voltages applied to the electrodes.

Generally, a panel with TFTs ("TFT array panel") includes, in addition to the TFTs, signal wires including gate lines transmitting scanning signals, data lines transmitting image signals, gate pads transmitting the scanning signals from external devices to the gate lines, and data pads transmitting the image signals from external devices to the data lines. The TFT array panel further includes pixel electrodes electrically connected to the TFTs and located in respective pixel areas defined by the intersections of the gate lines and the data lines.

In a reflective LCD or a transflective LCD, the pixel electrodes are made of a transparent conductive material such as indium tin oxide ("ITO") and overlap signal wires to ensure aperture ratio of pixels. Also, an insulating layer made of organic insulating material with low dielectric constant is formed between the signal wires and the pixel electrodes to minimize the interference of the signals transferred through them.

Moreover, the pixel electrodes of the transflective LCD are made of using a reflective conductive material such as Al or Ag as well as ITO, and formed to have embossment for increasing the reflecting ratio of the pixel electrodes. The embossment of the reflecting film is formed by providing an organic insulating layer with unevenness under the pixel electrode.

However, adhesiveness between the organic insulating layer and the ITO film is deteriorated when forming the ITO film on the insulating layer made of the organic insulating material. To solve the problem the roughness of the surface of the organic insulating layer is increased by performing a plasma process before depositing the ITO film.

However, contact resistance of a contact exposing the wire to be connected to the pixel electrode is increased since the organic material is re-deposited on the wire in the contact during the plasma process.

SUMMARY OF THE INVENTION

It is an object of the present invention to provide a TFT array panel and a manufacturing method thereof having good adhesiveness between an ITO film and an organic insulating film and minimizing contact resistance of a contact through which ITO is electrically connected to a wire.

In order to solve the problems, the present invention forms a protective layer under an organic insulating layer and performing surface-treatment of the organic insulating layer by a plasma process before deposition of an ITO film under the condition that the protective layer is remained on a wire.

In detail, in a method of manufacturing a thin film transistor array panel according to the present invention a gate wire including a gate line and a gate electrode connected to the gate line is formed, a gate insulating layer is deposited, a semiconductor layer is formed, and a data wire including a data line intersecting the gate lines to define a pixel area, a source electrode connected to the data line and placed dose to the gate electrode, and a drain electrode placed opposite the source electrode with respect to the gate electrodes is formed. Subsequently, a protective layer is deposited, then an organic insulating layer is formed by spin-coating an organic insulating material on the protective layer, the organic insulating layer is patterned to form a first contact hole exposing the protective layer opposite the drain electrode, and a surface of the organic insulating layer is treated by plasma process using inactive gas. Also, the protective layer is patterned to form a second contact hole exposing the drain electrode and located inside the first contact hole and a pixel electrode electrically connected to the drain electrode through the first and the second contact holes is formed.

The pixel electrode may include a transparent conductive electrode or a reflective conductive film. The surface of the organic insulating layer preferably has an unevenness pattern when the pixel electrode has the reflective film. The reflective film has an aperture in the pixel area.

The semiconductor layer may include amorphous silicon or poly silicon. The protective layer may include SiNx or SiOx. Preferably, the second contact hole may be formed by a photo etch using a photoresist pattern after forming the first contact hole.

It is preferable that the gate wire further includes a gate pad connected to one end of the gate line, the data wire further includes a data pad connected to one end of the data line, and the protective layer or the gate insulating layer has a third contact hole exposing the gate pad or the data pad. The thin film transistor array panel preferably further includes a subsidiary pad electrically connected to the gate pad or the data pad through the third contact hole and including substantially the same layer as the pixel electrode.

Both the data wire and the semiconductor layer may be formed by a photo etch step using a photoresist pattern with position-dependent thickness.

BRIEF DESCRIPTION OF THE DRAWINGS

FIGS. 18A, 19A and 20A and FIGS. 18B, 19B and 20B are respective sectional views of the TFT array panel shown in FIG. 17A taken along the lines XVIIB–XVIIB' and XVIIC–XVIIC', respectively, and illustrate the steps following the step shown in FIGS. 17B and 17C;

FIGS. 21B and 21C are sectional views of the TFT array panel shown in FIG. 21A taken along the lines XXIB–XXIB' and XXIC–XXIC', respectively;

DETAILED DESCRIPTION OF PREFERRED EMBODIMENTS

Now, TFT array panels and manufacturing methods thereof according to embodiments of the present invention will be described with reference to the accompanying drawings, which makes those skilled in the art to easily carry out the present invention.

First, a transflective type LCD according to a first embodiment of the present invention will be described in detail with reference to FIGS. 1 and 2.

Figure 1:
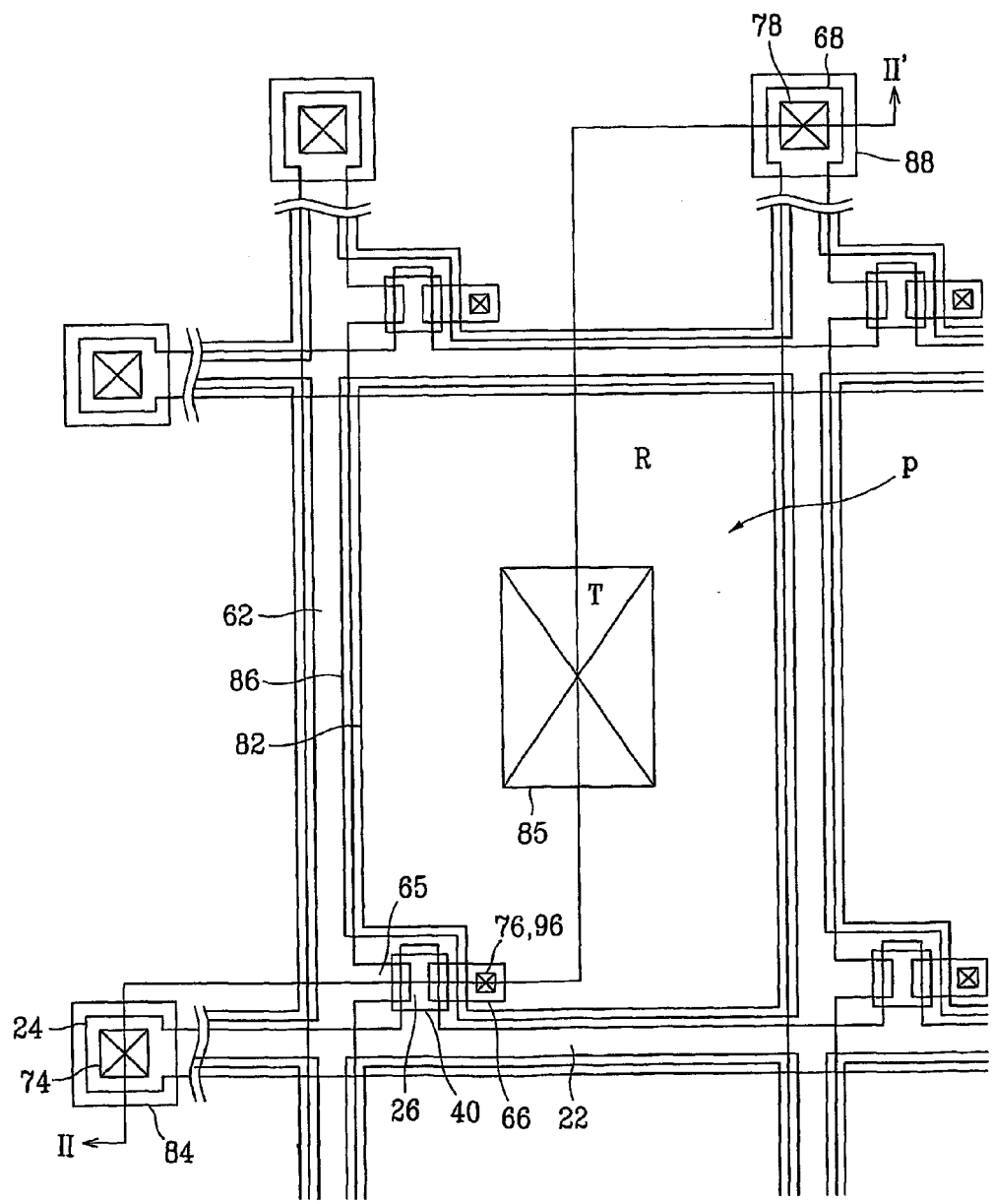
FIG. 1 is a layout view of a TFT array panel for a transflective type LCD according to a first embodiment of the present invention.
Figure 2:
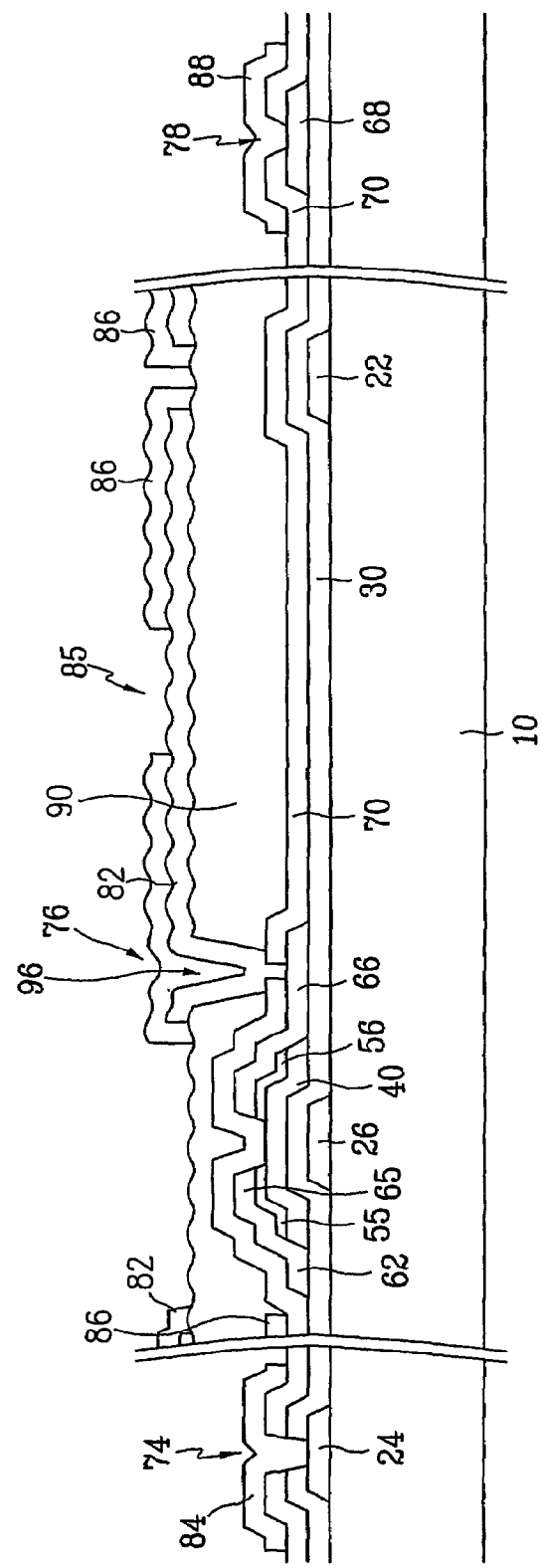
FIG. 2 is a sectional view of FIG. 2 taken along the line II–II'.

FIG. 1 is a layout view of a TFT array panel for a transflective type LCD according to a first embodiment of the present invention, and FIG. 2 is a sectional view of the TFT array panel shown in FIG. 1 taken along the line II–II'.

A gate wire is formed on an insulating substrate 10. The gate wire includes either a single layer preferably made of Ag, Ag alloy, Al and Al alloy having low resistivity, or multiple layers including the single layer. The gate wire includes a plurality of gate lines 22 extending substantially in a transverse direction, a plurality of gate pads 24 connected to one ends of the gate lines 22 for receiving gate signals from external devices and transmitting the gate signals to the gate lines 22, and a plurality of gate electrodes 26 of TFTs connected to the gate lines 22. The gate wire may overlap pixel electrodes 82 and 86, which will be formed later, to form storage capacitors, or may include a plurality of storage electrodes applied with a predetermined voltage such as a common electrode voltage (which is applied to a common electrode of an upper panel and referred to as "a common voltage" hereinafter) from an external source such that the storage electrodes overlap the pixel electrodes 82 and 86, which will be described later, to form storage capacitors for improving the charge storing capacity of pixels.

The gate wire 22, 24 and 26 is covered by a gate insulating layer 30 preferably made of SiNx formed on the substrate 10.

A semiconductor pattern 40 preferably made of amorphous silicon is formed on the gate insulating layer 30 opposite the gate electrodes 24, and an ohmic contact layer pattern 55 and 56 preferably made of silicide or n+ hydrogenated amorphous silicon heavily doped with n type impurity is formed on the semiconductor pattern 40.

A data wire is formed on the ohmic contact layer pattern 55 and 56 and the gate insulating layer 30. The data wire includes a conductive layer preferably made of conductive material with low resistivity such as Al and Ag. The data wire includes a plurality of data lines 62 extending substantially in a longitudinal direction and intersecting the gate lines 22 to define pixel areas, a plurality of source electrodes 65 connected to the data lines 62 and extending to one portions 55 of the ohmic contact layer pattern, a plurality of data pads 68 connected to one ends of the data lines 62 for receiving image signals from external devices, and a plurality of drain electrodes 66 separated from the source electrodes 65 and located on the other portions 56 of the ohmic contact layer pattern opposite the source electrodes 65 with respect to the gate electrodes 26.

A protective layer 70 preferably made of SiNx is formed on the data wire 62, 65, 66 and 68 and portions of the semiconductor pattern 40, which are not covered by the data wire 62, 65, 66 and 68, and an organic insulating layer 90 is formed on the protective layer 70. The organic insulating layer 90 is preferably made of photosensitive organic material having a good flatness characteristic. The top surface of the organic layer 90 has an evenness pattern to maximize the reflecting efficiency of a reflecting film 86, which will be described later. At pad areas with the gate pads 24 and the data pads 68, the organic insulating layer 90 is removed out, while the protective layer 70 is still remained. This structure removes organic insulating material on the pad areas and thus is advantageously applicable to a chip on glass ("COG") type LCD, where a plurality of gate driving integrated circuits ("ICs") and a plurality of data driving ICs for respectively transmitting the scanning signals and the image signals to the gate pads 24 and the data pads 68 are directly mounted on the TFT array panel.

A plurality of contact holes 76 and 78 respectively exposing the drain electrodes 66 and the data pads 68 are provided at the protective layer 70, and a plurality of contact holes 74 exposing the gate pads 24 are provided at the gate insulating layer 30 and the organic insulating layers 90. The organic insulating layer 90 has a plurality of contact holes 96 exposing the drain electrodes 66, the boundaries of the contact holes 76 of the protective layer 70 exposing the drain electrodes 66, and the flat surface of the protective layer 70.

A plurality of transparent electrodes 82 are formed on the organic insulating layer 90. The transparent electrodes 82 are located substantially in a pixel area, and electrically connected to the drain electrodes 66 through the contact holes 76 and 96. A reflecting film 86 having an aperture 85 is formed on each transparent electrode 82. Among the pixel area P, an area T defined by the aperture 85 is referred to as a transmitting area, while the remaining area R is referred to as a reflecting area. The transparent electrodes 82 are preferably made of transparent conductive material such as indium zinc oxide ("IZO") and indium tin oxide ("ITO"), while the reflecting films 86 are preferably made of Al, Al alloy, Ag and Ag alloy having reflectance. Each reflecting film 86 preferably includes a contact assistant layer provided on a contact surface with the transparent electrode 82 to ensure good contact characteristics between the reflecting film 86 and the transparent electrode 82, and the contact assistant layer is preferably made of Mo, Mo alloy, Cr, Ti or Ta.

Furthermore, a plurality of subsidiary gate pads 84 and a plurality of subsidiary data pads 88 are formed on the protective layer 70. The subsidiary gate pads 84 and the subsidiary data pads 88 are connected to the gate and the data pads 24 and 68 through the contact holes 74 and 78, respectively. Although the subsidiary gate and data pads 84 and 88 are not requisites but preferred to protect the gate and the data pads 24 and 68. The subsidiary gate and data pads 84 and 88 are preferably made of the same layer either as the transparent electrodes 82 or as the reflecting film 86.

A method of manufacturing a TFT array panel for a transflective type LCD according to the first embodiment of the present invention will be now described with reference to FIGS. 3A to 8B as well as FIGS. 1 and 2.

Figure 3A:
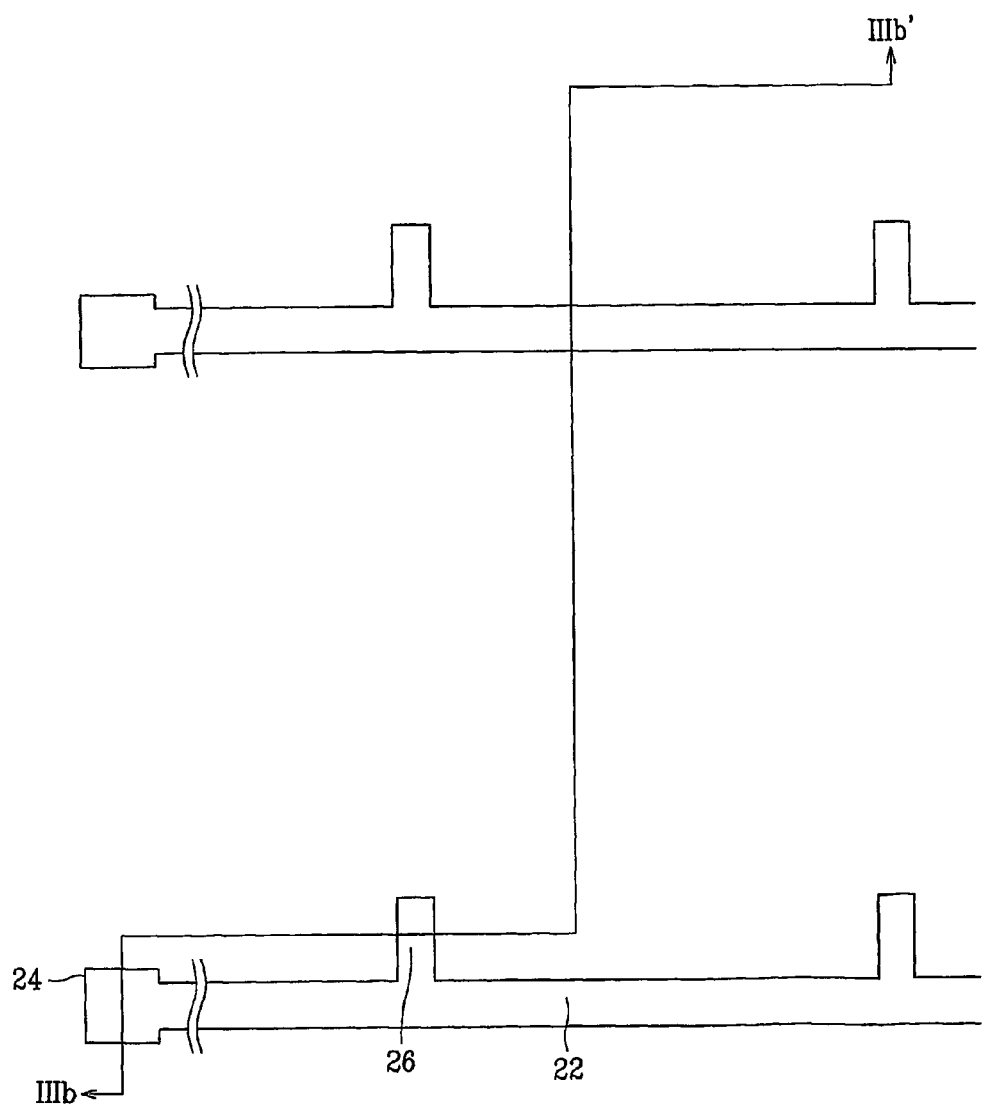
FIGS. 3A, 4A, 5A, 6A, 8A and 9A are layout views of a TFT array panel for a transflective type LCD in the intermediate steps of a manufacturing method thereof according to an embodiment of the present invention.
Figure 3B:
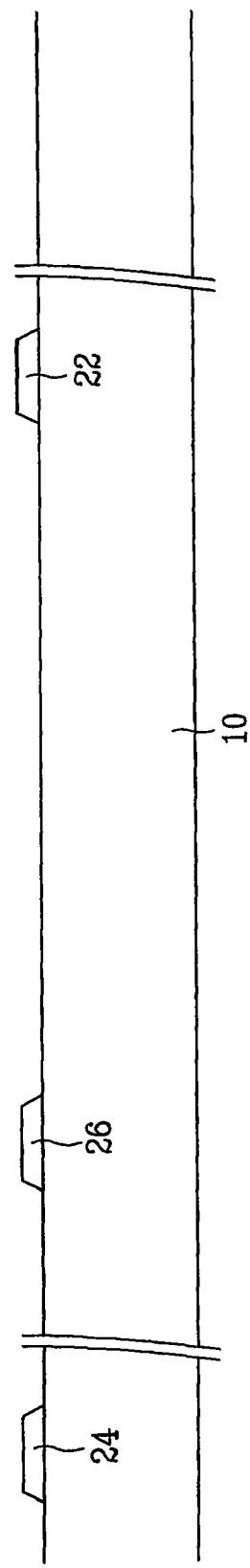
FIG. 3B is a sectional view of the TFT array panel shown in FIG. 3A taken along the line IIIB–IIIB'.

As shown in FIGS. 3A and 3B, a conductive material with low resistivity is deposited on a glass substrate 10, and patterned by photo etch using a mask to form a gate wire extending substantially in the transverse direction including a plurality of gate lines 22, a plurality of gate electrodes 26, and a plurality of gate pads 24.

Figure 4A:
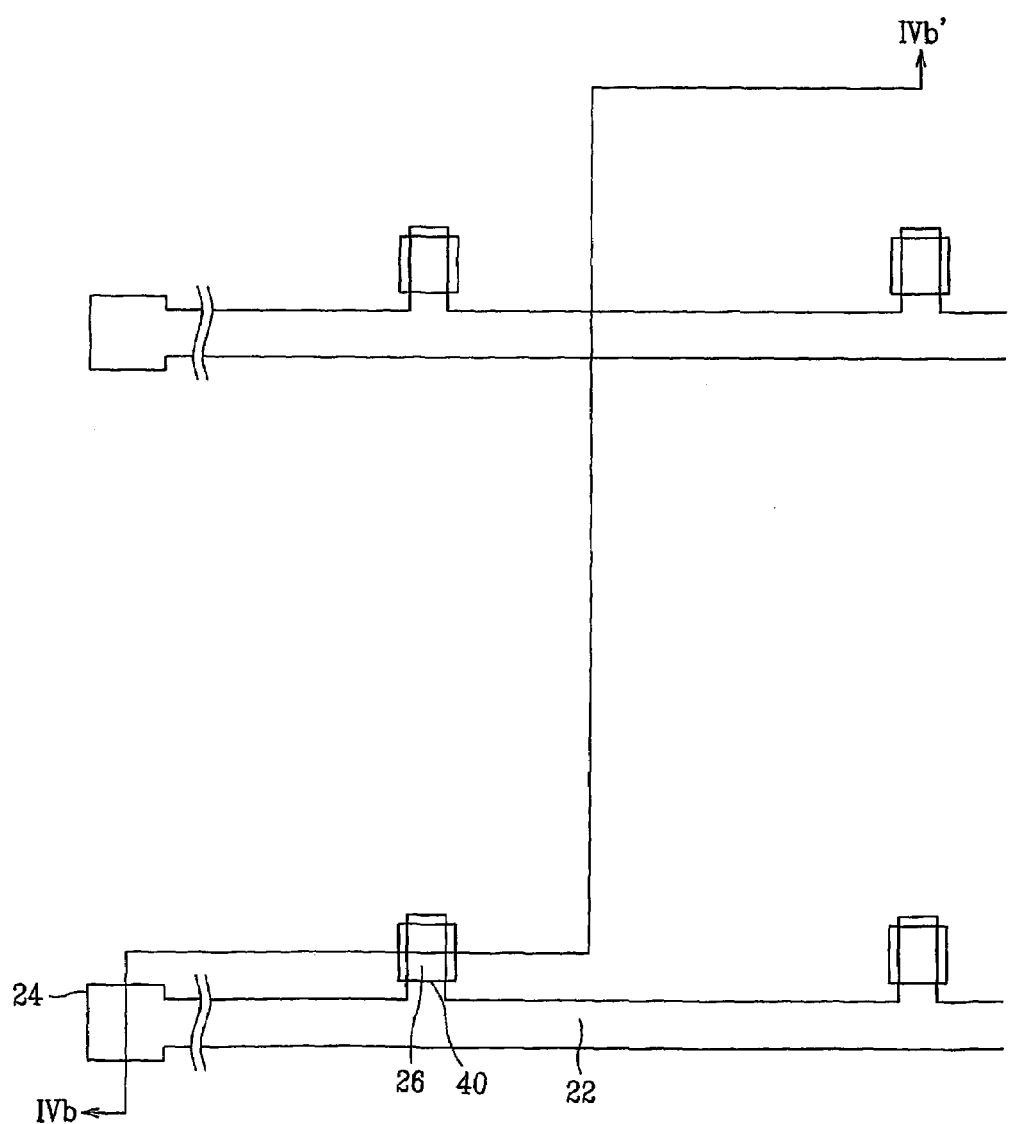
Figure 4B:
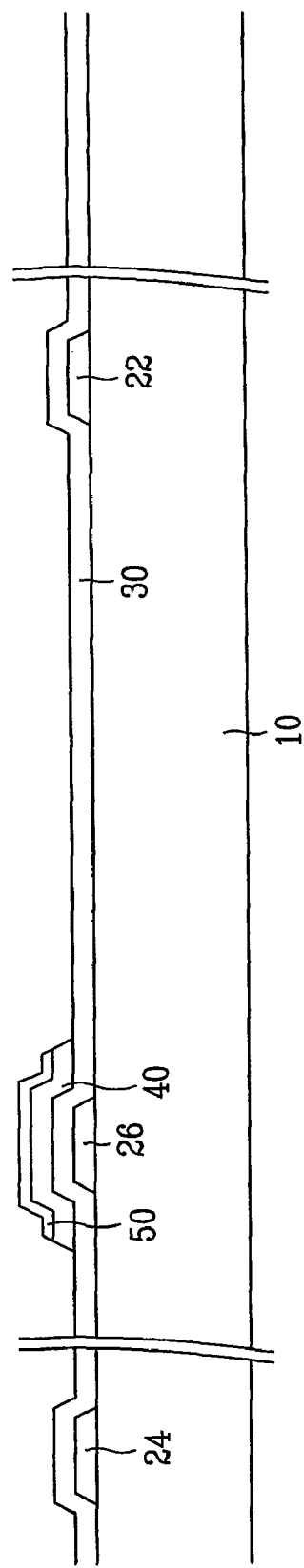
FIG. 4B is a sectional view of the TFT array panel shown in FIG. 4A taken along the line IV–IV' and illustrates the step following the step shown in FIG. 3B.

Next, as shown in FIGS. 4A and 4B, after sequentially depositing three layers including a gate insulating layer 30 made of SiNx, a semiconductor layer 40 made of amorphous silicon, and a doped amorphous silicon layer 50, the doped amorphous silicon layer 50 and the semiconductor layer 40 are patterned by photo etch using a mask to form a semiconductor pattern 40 and a doped amorphous silicon layer pattern 50 on the gate insulating layer 30 opposite the gate electrodes 24. At that time, the semiconductor pattern 40 may be formed along the data lines 62 which are described later.

Figure 5A:
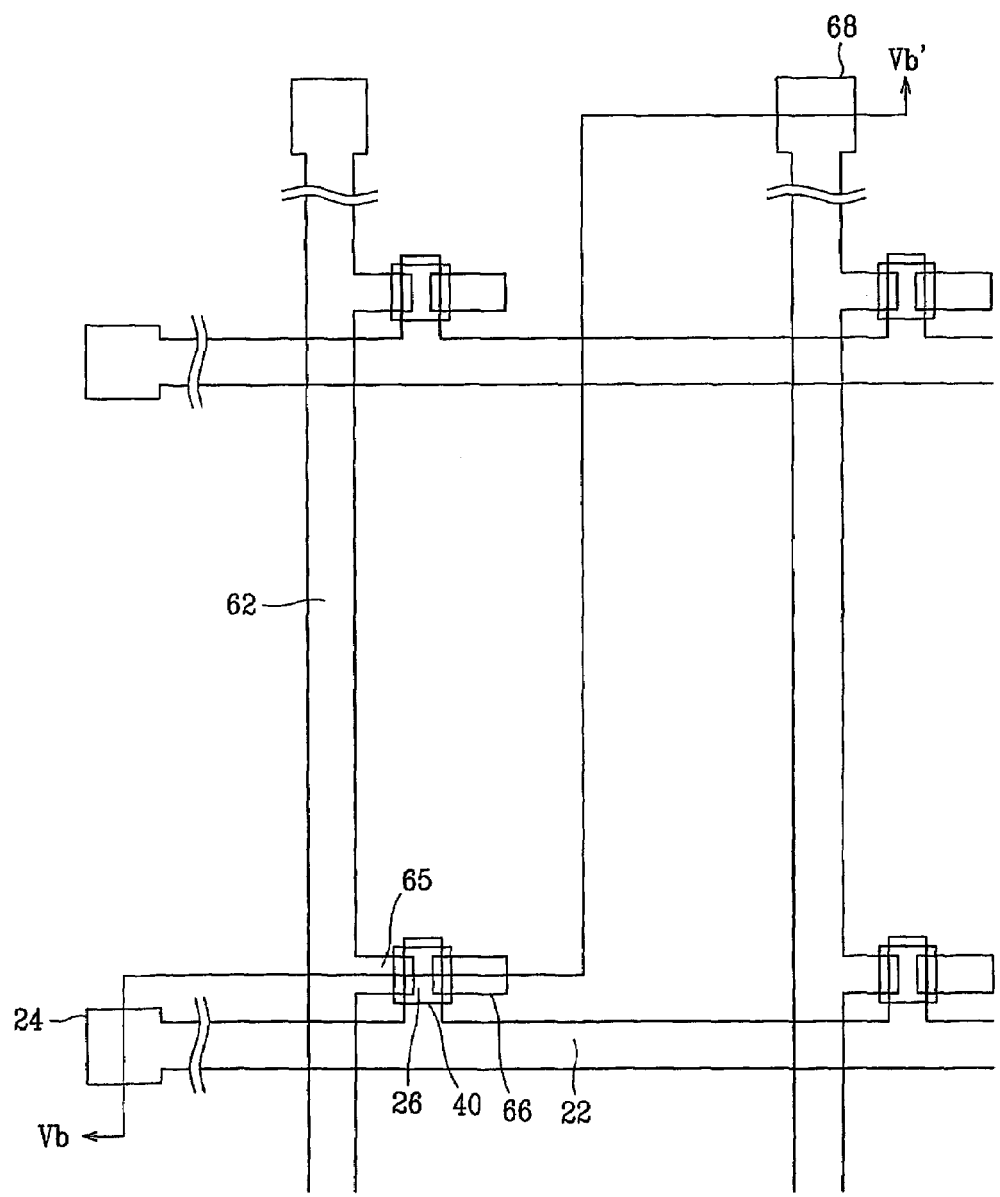
Figure 5B:
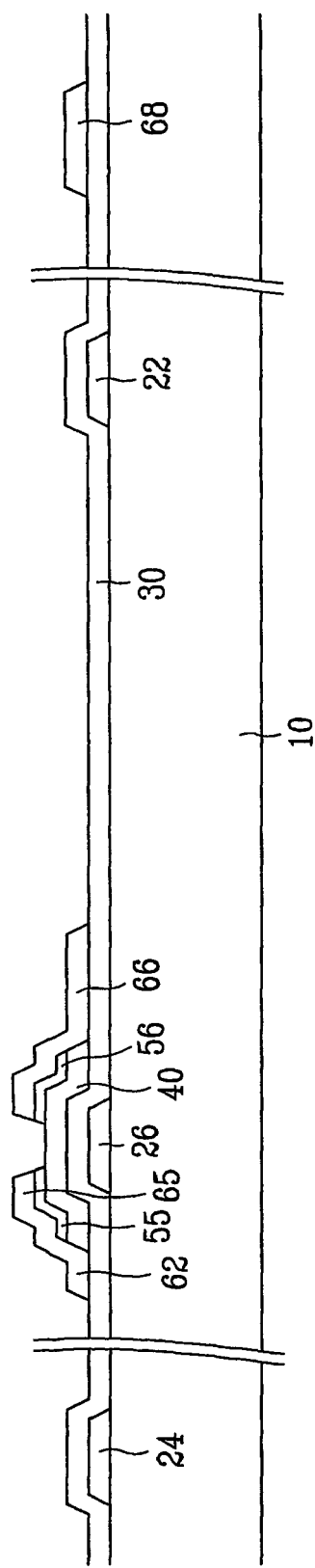
FIG. 5B is a sectional view of the TFT array panel shown in FIG. 5A taken along the line VB–VB' and illustrates the step following the step shown in FIG. 4B.

Subsequently, as shown in FIGS. 5A and 5B, a conductive layer for a data wire is deposited and patterned by photolithography using a mask to form a data wire including a plurality of data lines 65 intersecting the gate lines 22, a plurality of source electrodes 65 connected to the data lines 65 and extending onto the gate electrodes 26, a plurality of data pads 68 connected to one ends of the data lines 62, and a plurality of drain electrodes 66 separated from the source electrodes 65 and opposite the source electrodes 65 with respect to the gate electrodes 26.

Thereafter, portions of the doped amorphous silicon pattern 50, which are not covered by the data wire 62, 65, 66 and 68, are etched such that the doped amorphous silicon layer pattern 50 is separated into two portions 55 and 56 opposite each other with respect to the gate electrodes 26 to expose portions of the semiconductor pattern 40 between the two portions of the doped amorphous silicon layer pattern 55 and 56. Oxygen plasma treatment is preferably performed in order to stabilize the exposed surfaces of the semiconductor pattern 40.

Figure 6A:
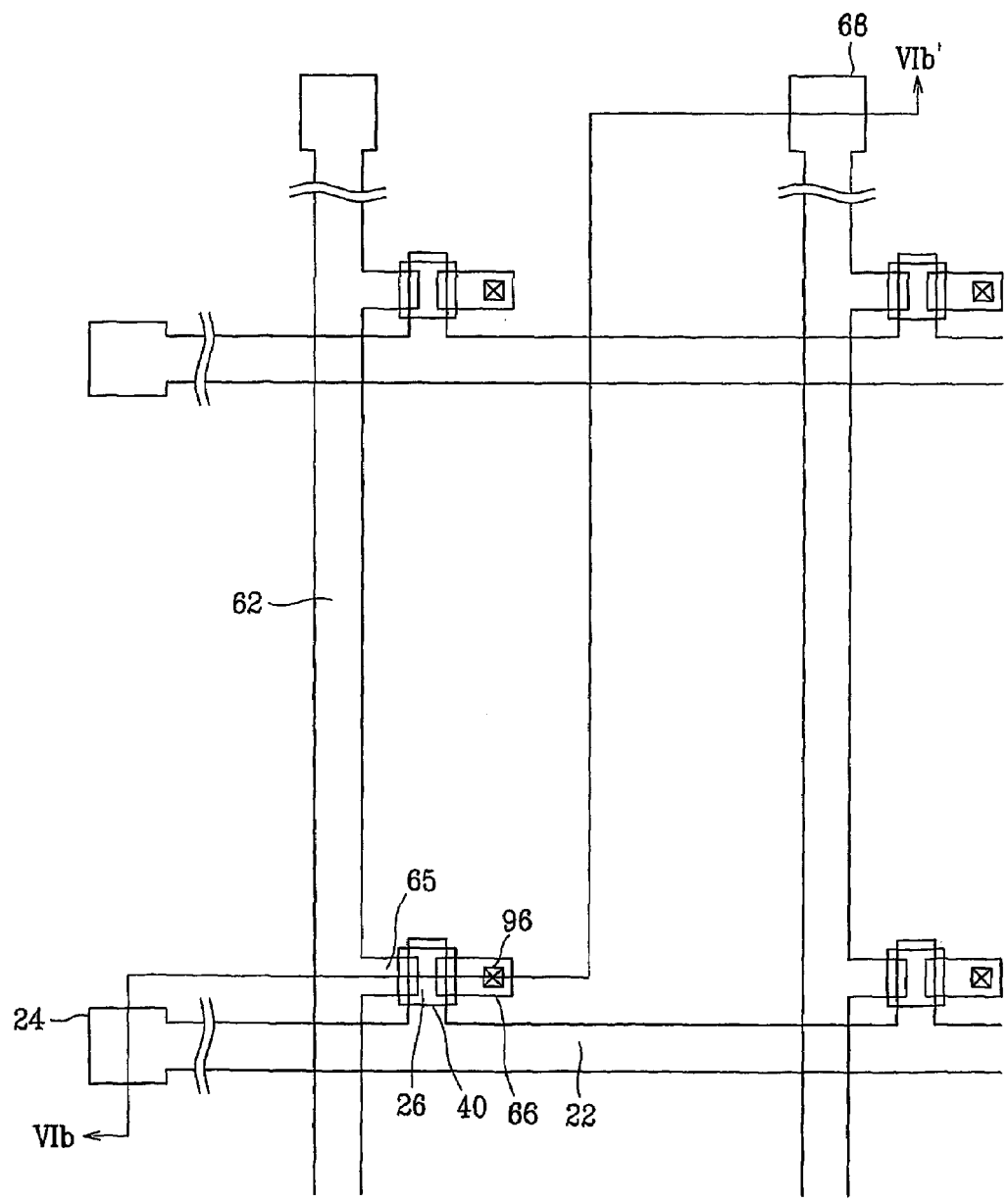
Figure 6B:
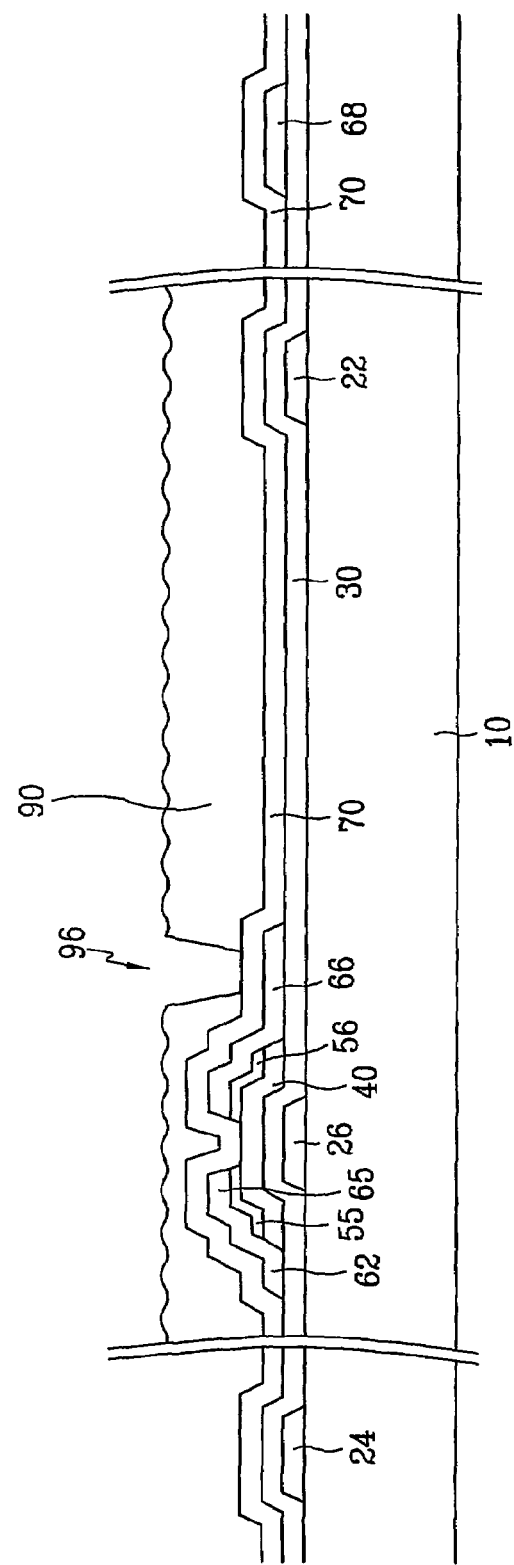
FIG. 6B is a sectional view of the TFT array panel shown in FIG. 6A taken along the line VIB–VIB' and illustrates the step following the step shown in FIG. 5B.

As shown in FIGS. 6A and 6B, SiNx is deposited by CVD to form a protective layer 70, and a photosensitive organic material having a good flatness characteristic is coated on the protective layer 70 to form an organic insulating layer 90 before patterning the protective layer 70. Thus, the spin-coating of the organic insulating layer 90 before patterning the protective layer 70 prevents the localized distribution of organic material onto a specific area since there is no height difference due to the protective layer 70 during the spin coating. Thereafter, the organic insulating layer 90 is patterned by photolithography using a mask to form a plurality of contact holes 96 exposing portions of the protective layer 70 opposite the drain electrodes 66 and simultaneously to form an unevenness pattern on the surface of the organic insulating layer 90. Furthermore, portions of the organic insulating layer 90 at the pad areas provided with the gate pads 24 and the data pads 68 are removed to expose the protective layer 70.

Figure 7:
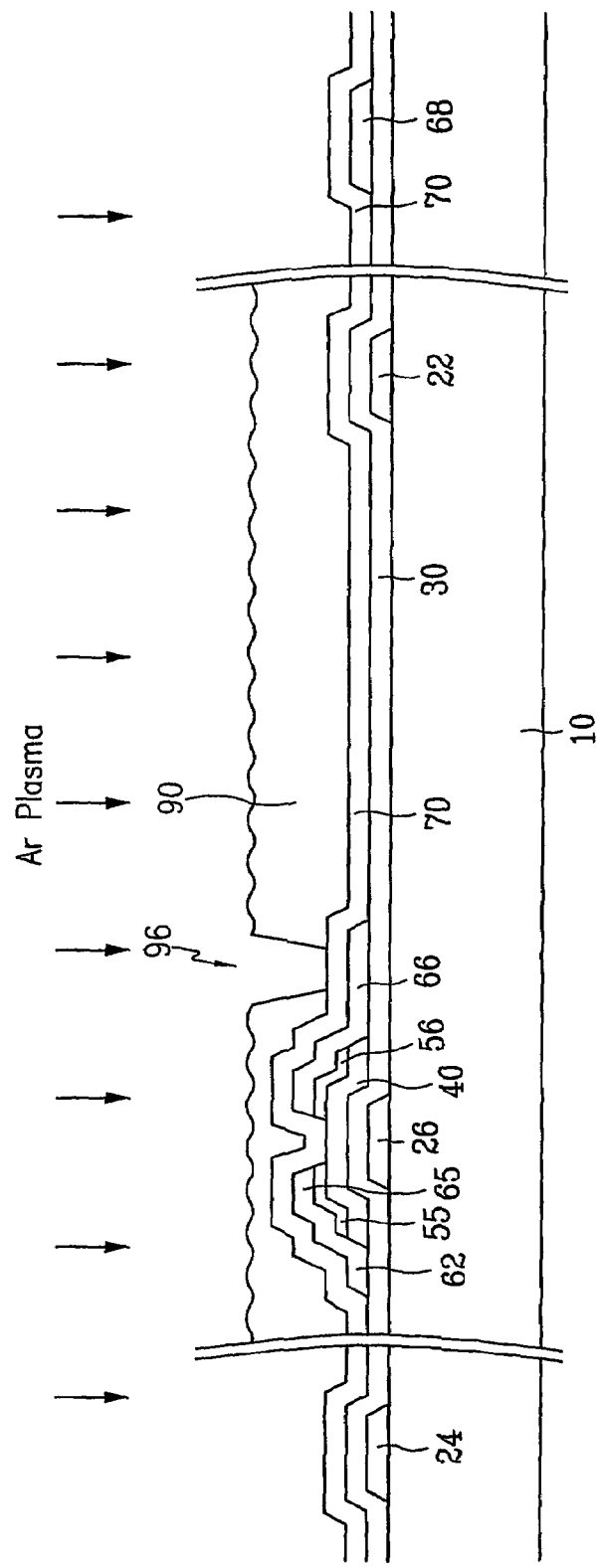
FIG. 7 is a sectional view of the TFT array panel shown in FIG. 6A taken along the line VIB–VIB' and illustrates the step following the step shown in FIG. 6B.

Subsequently, as shown in FIG. 7, a plasma process using Ar gas is executed to enhance surface roughness of the organic insulating layer 90 before patterning the protective layer 70. Here, Ar gas may be replaced with inactive gas such as N2, He, Ne, Kr and Xe. The surface roughness of the organic insulating layer 90 is enhanced by the plasma process to improve the adhesiveness of an ITO film 82 which will be described later. According to an embodiment of the present invention, since the plasma process is executed before patterning the protective layer 70, the gate lines or the data lines which may be exposed later on a contact are not injured.

Figure 8A:
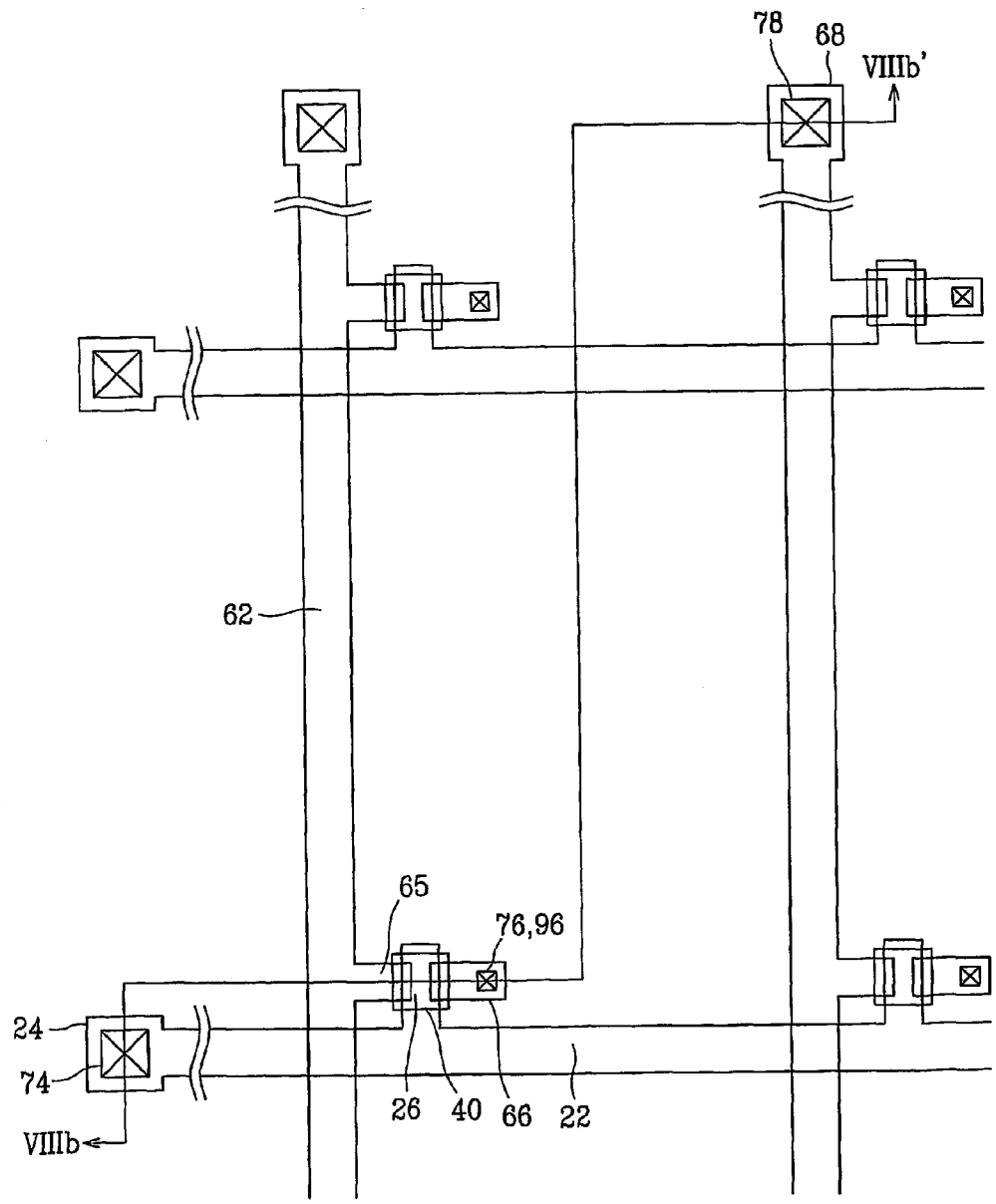
Figure 8B:
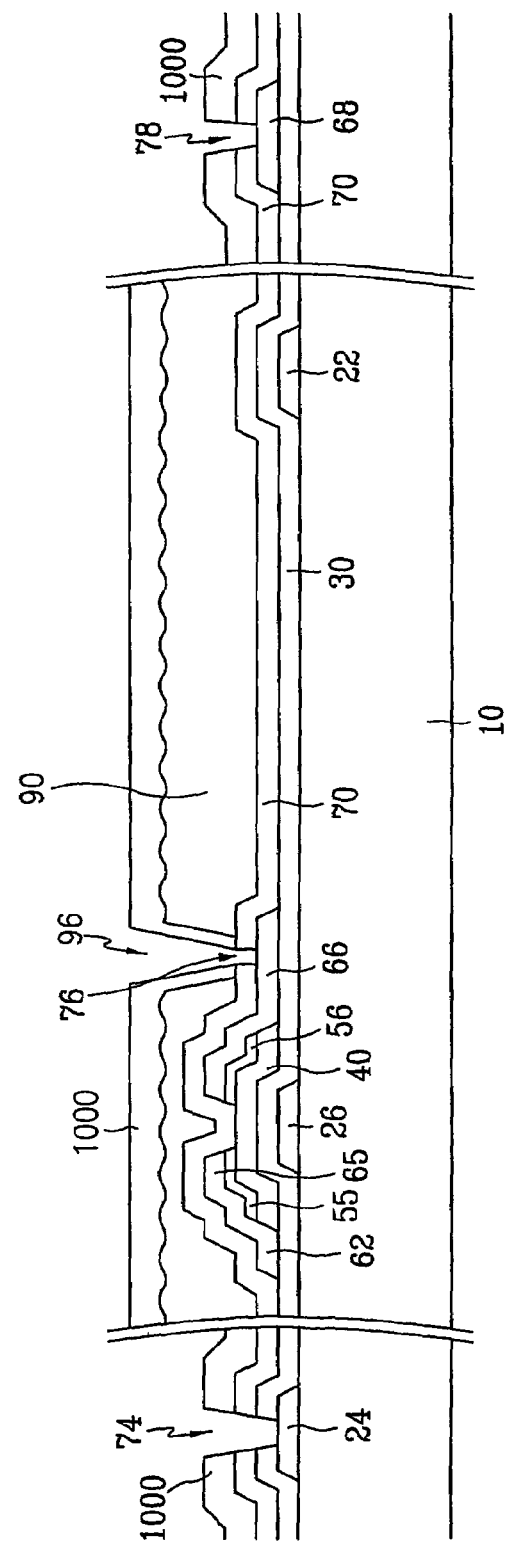
FIG. 8B is a sectional view of the TFT array panel shown in FIG. 8A taken along the line VIIIB–VIIIB' and illustrates the step following the step shown in FIG. 7.

Subsequently, as shown in FIGS. 8A and 8B, the protective layer 70 and the gate insulating layer 30 are patterned by photo etch using a photoresist pattern 1000 to form a plurality of contact holes 74, 76 and 78 exposing the gate pads 24, the drain electrodes 66, and the data pads 68, respectively. The contact holes 76 of the protective layer 70 exposing the drain electrodes 66 are placed inside the contact holes 96 of the organic insulating layer 90 such that the boundaries and the flat surfaces of the protective layer 70 are exposed, and therefore the contact structures have step-wise shapes without undercut It is preferable that the width of the exposed surface of the protective layer 70 at the contact structure is 0.1 microns or more.

When the data wire 62, 65, 66 and 68 or the gate wire 22, 24 and 26 have multiple layers and the top layer of the data wire 62, 65, 66 and 68 or the gate wire 22, 24 and 26 is formed of Al or Al alloy, the top layer is removed to prevent the top layer of Al or Al alloy from contacting an ITO film, which will be formed later, at a contact.

Figure 9A:
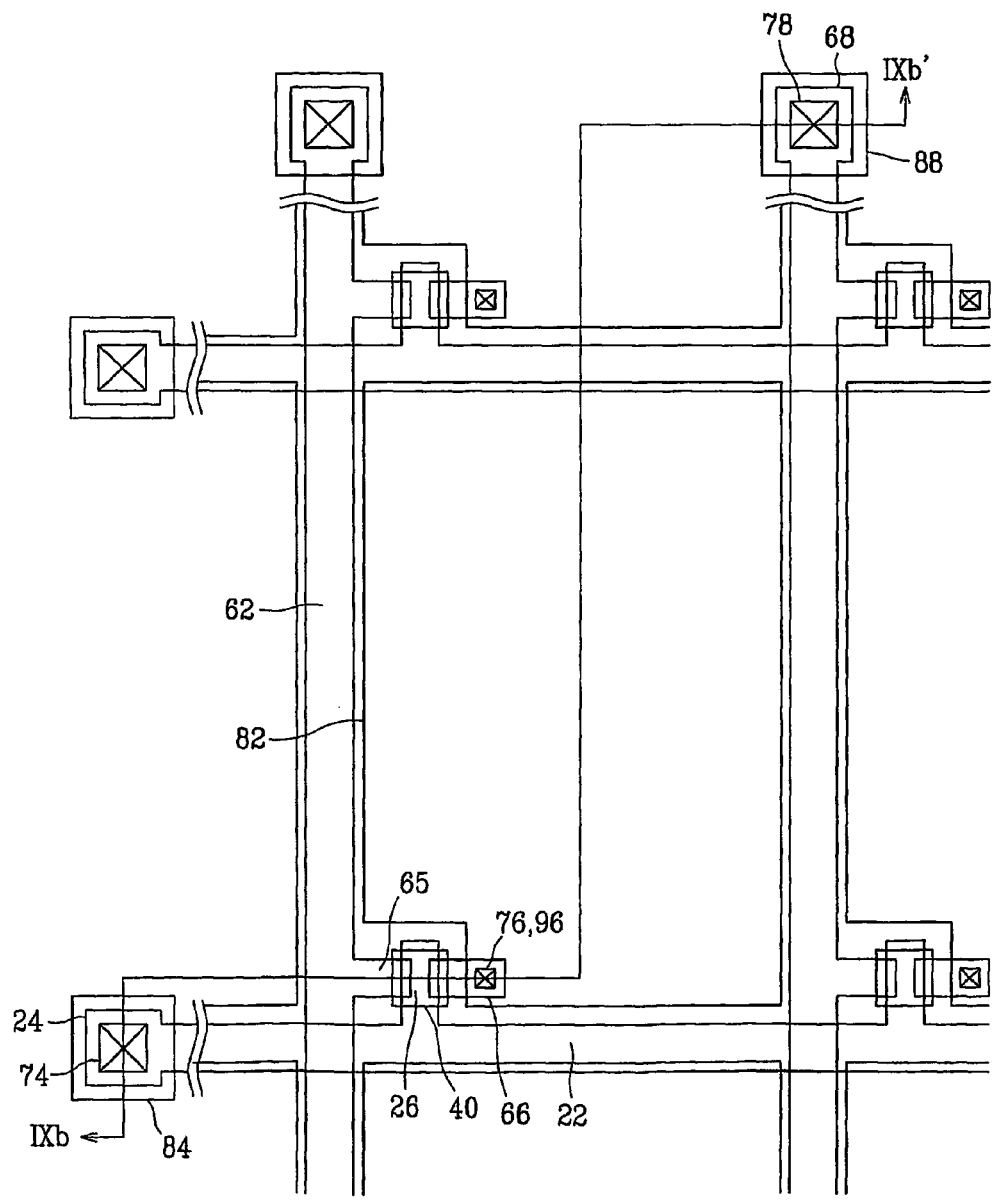
Figure 9B:
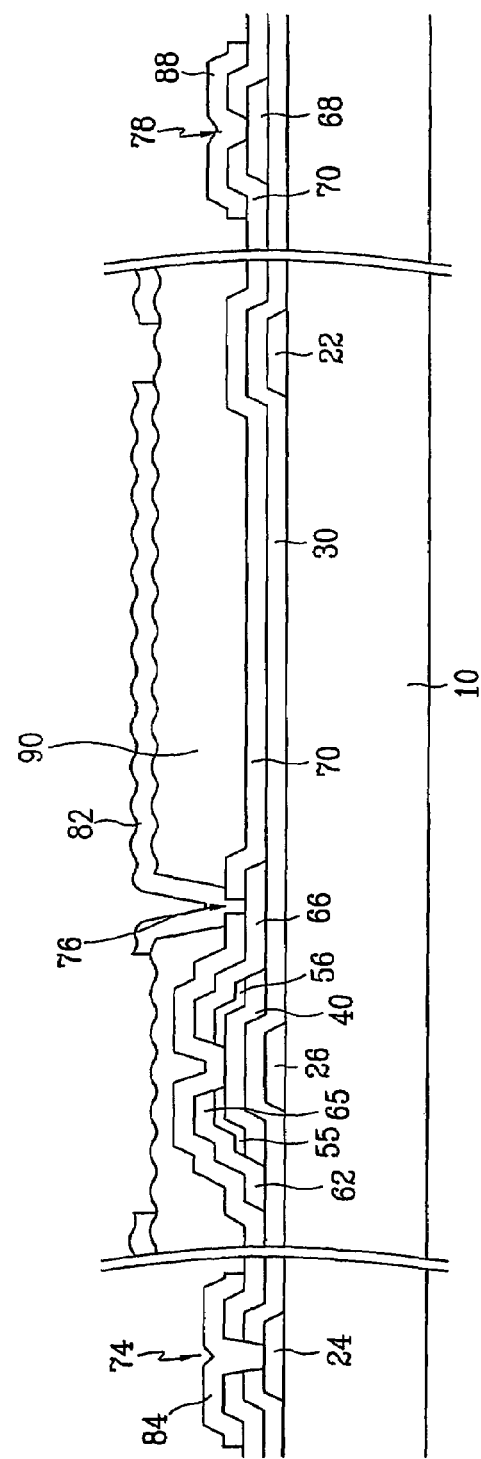
FIG. 9B is a sectional view of the TFT array panel shown in FIG. 9A taken along the line IXB–IXB' and illustrates the step following the step shown in FIG. 8B.

Next, as shown in FIGS. 9A and 9B, ITO is deposited and patterned using a mask to form a plurality of transparent electrodes 82 connected to the drain electrodes 66 through the contact holes 76 and 96, a plurality of subsidiary gate pads 84 connected to the gate pads 24 through the contact holes 74, and a plurality of subsidiary data pads 88 connected to the data pads 68 through the contact holes 78.

A manufacturing method of a TFT array panel according to the first embodiment of the present invention prevents the wires from being damaged at a contact by performing plasma process before the protective layer 70 is removed at the contact, as described above. In addition, organic insulating material remaining inside the contact holes 76, 96, 74 and 78 is completely removed by performing plasma process for surface-treating the organic insulating layer 90 before patterning the protective layer 70 by photo etch for forming the contact holes 74, 76 and 78 at the protective layer 70. Therefore, contact resistance at a contact is minimized and inactive gas which may be remained during the plasma process is completely removed.

Finally, as shown in FIGS. 1 and 2, a reflective conductive material including Ag or Al with reflectance is deposited and patterned by photo etch using a mask to form a plurality of reflecting films 86 on the respective transparent electrodes 82. At this time, each reflecting film 86 preferably includes a contact assistant layer made of material having a good contact characteristic with other materials to improve the contact characteristic with the transparent electrode 82.

According to the first embodiment of the present invention, the spin-coating of the organic insulating layer 90 before patterning the protective layer 70 prevents the localized distribution of organic material onto a specific area since there is no height difference due to the protective layer 70 during the spin coating, thereby obtaining a uniform unevenness pattern on the organic insulating layer 90. As a result, the embossment of the reflecting film 86 following the unevenness pattern of the organic insulating layer 90 is established to be uniform, and this prevents stains on a screen displaying images.

The method of manufacturing a TFT array panel according to this embodiment of the present invention completely prevents organic insulating material from remaining on the pad areas because the protective layer 70 is patterned after removing the organic insulating material from the pad areas in the formation of the organic insulating layer 90. Therefore, the TFT array panel manufactured by this method is advantageously applicable particularly to a COG type LCD, where a plurality of gate driving ICs and a plurality of data driving ICs for respectively transmitting the scanning signals and the image signals to the gate pads 24 and the data pads 68 are directly mounted on the TFT array panel.

In the meantime, the manufacturing method according to the first embodiment of the present invention can be adapted to a method for manufacturing a TFT array panel for a reflective type LCD.

A TFT array panel for a reflective type LCD according to a second embodiment of the present invention will be described in detail with reference to FIGS. 10 and 11.

Figure 10:
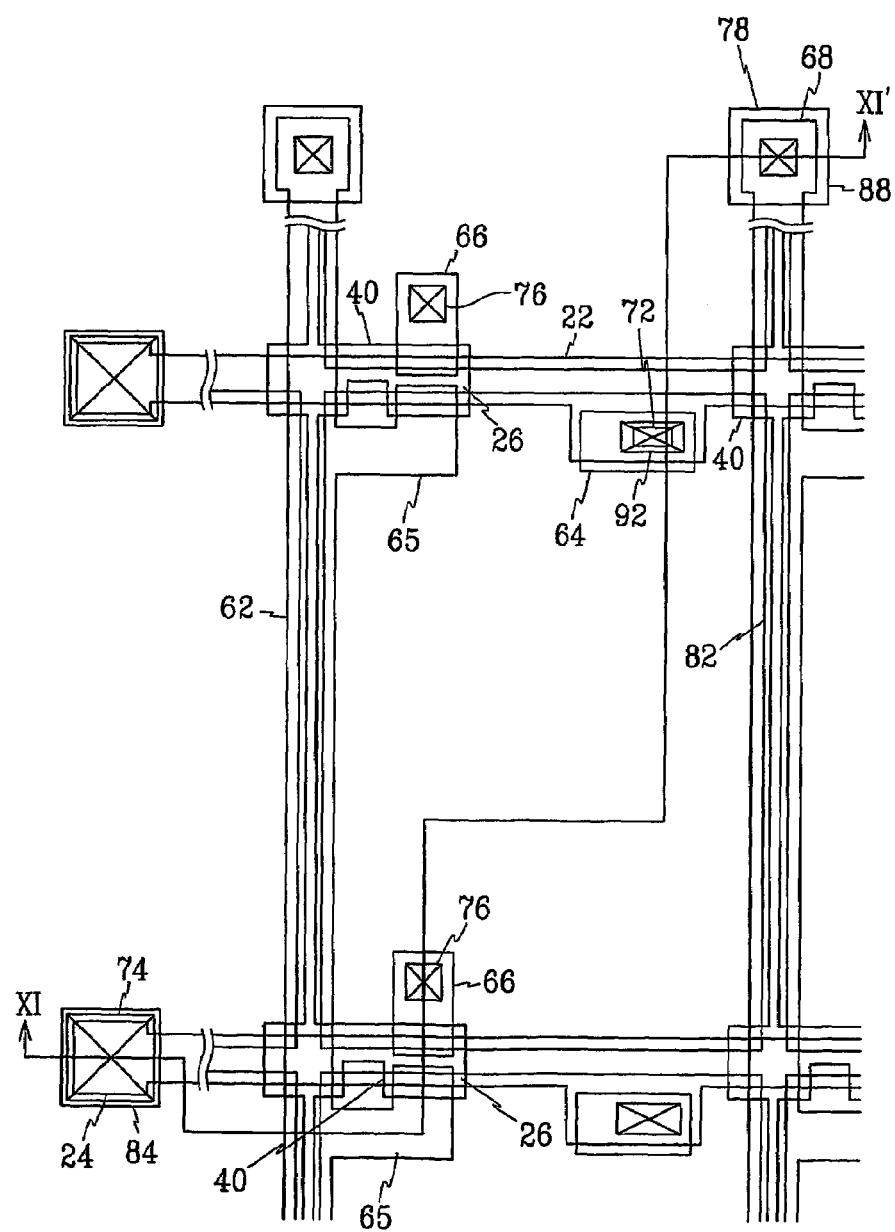
FIG. 10 is a layout view of a TFT array panel for a reflective type LCD according to a second embodiment of the present invention.
Figure 11:
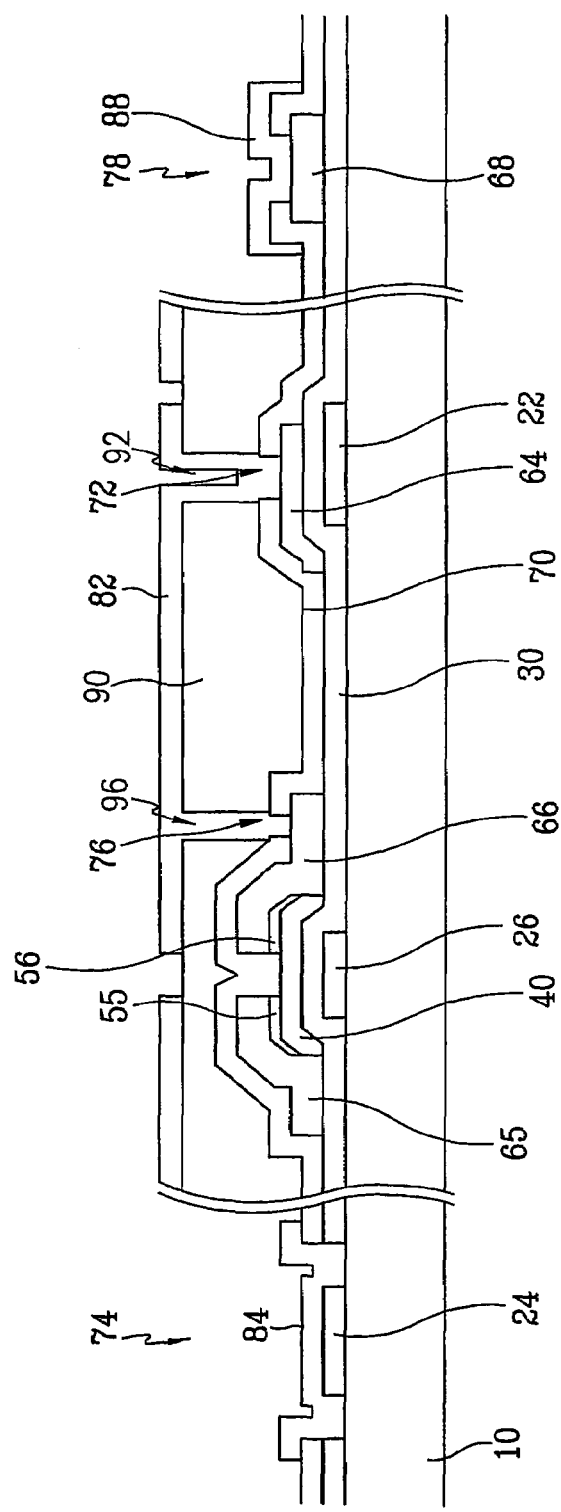
FIG. 11 is a sectional view of the TFT array panel shown in FIG. 10 taken along the line XI–XI'.

As shown in FIGS. 10 and 11, the structure is almost the same as the structure according to the first embodiment.

However, different from the first embodiment, a plurality of reflecting films 86 are located directly on an organic insulating layer 90 and in direct electrical connection with a plurality of drain electrodes 66 through a plurality of contact holes 76 and 96. In addition, the reflecting film 86 occupies the entire pixel area.

Moreover, a plurality of gate wire 22, 24 and 26 and a plurality of data wire 62, 65 and 66 overlap relevant pixel electrodes 82 via the organic insulating layer 90 with low dielectric constant to give maximum aperture ratio.

Furthermore, a data wire 62, 65, 66 and 68 includes a conductor pattern 64 for storage capacitors overlapping the gate lines 22, and the pixel electrodes 82 made of a transparent conductive material are placed directly on an organic insulating layer 90. The pixel electrodes are located substantially in pixel areas and electrically connected to a plurality of drain electrode 66 through contact holes 76 and 96. The pixel electrodes 82 are electrically connected to the conductor pattern 64 through contact holes 72 and 92 provided at the protective layer 70 and the organic insulating layer 90, and contact holes 74 provided at the protective layer 70 and a gate insulating layer 30 exposing gate pads 24 are wider than the gate pads 24.

A method of manufacturing a TFT array panel for a transmissive type LCD according to the second embodiment of the present invention is almost the same as the method according to the first embodiment, until the step of forming contact holes 72, 74, 76 and 78 at a protective layer 70.

The method of manufacturing the TFT array panel according to the second embodiment of the present invention provides a semiconductor layer 40 extending in the longitudinal direction along the data wire 62, 65, 66 and 68, and does not form an unevenness pattern on the surface of an organic insulating layer 90.

The above-described manufacturing method according to the embodiments of the present invention can be applied to a method of manufacturing a TFT array panel for a transmissive type LCD forming both a semiconductor layer and a data wire by photo etch using one photoresist pattern, thereby simplifying the manufacturing process. This method will be described in detail with reference to accompanying drawings.

First, a structure of a unit pixel of a TFT array panel for an LCD manufactured using four masks according to an embodiment of the present invention will be described with reference to FIGS. 12 to 14.

Figure 12:
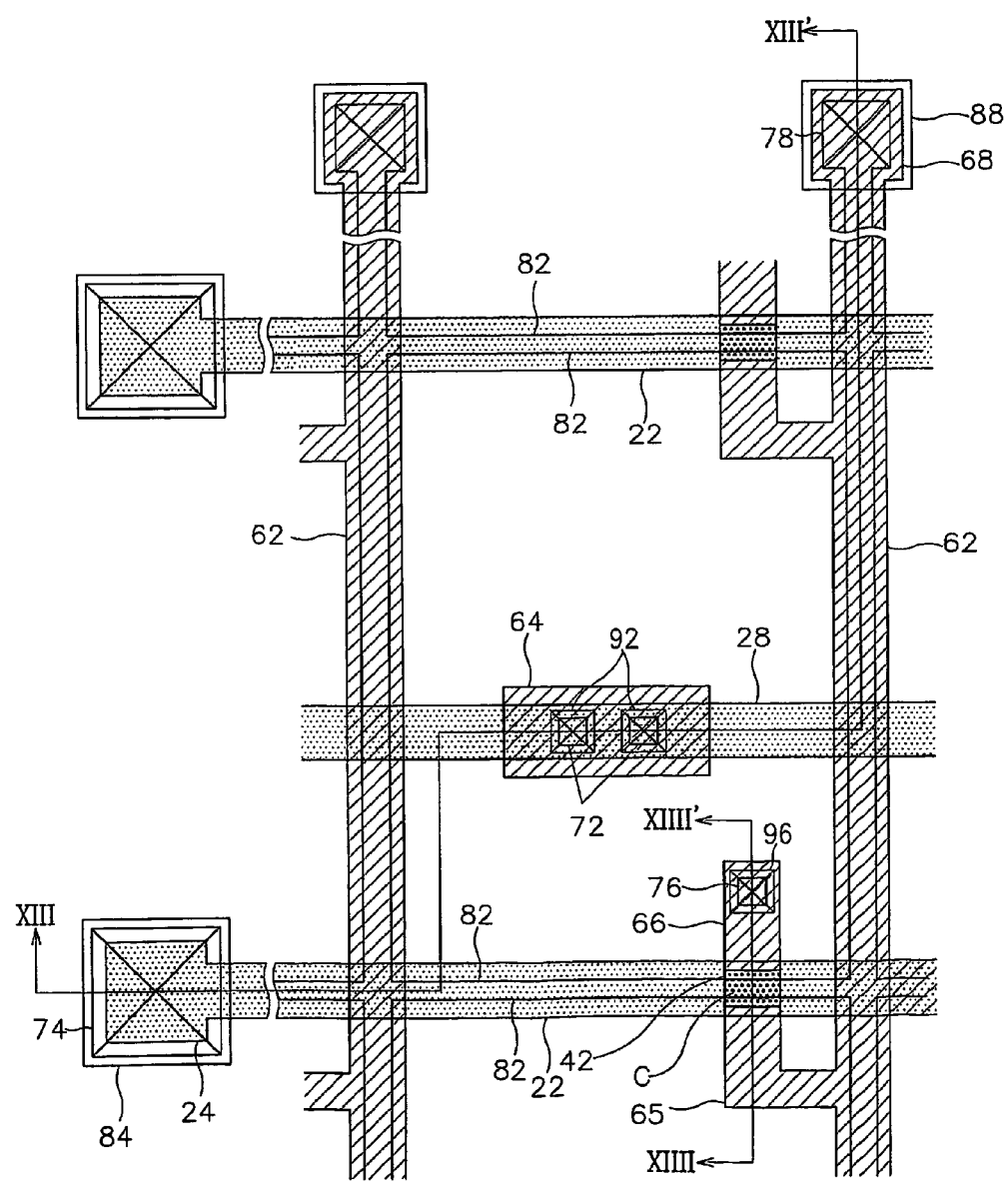
FIG. 12 is a layout view of a TFT array panel for an LCD according to a third embodiment of the present invention.
Figure 13:
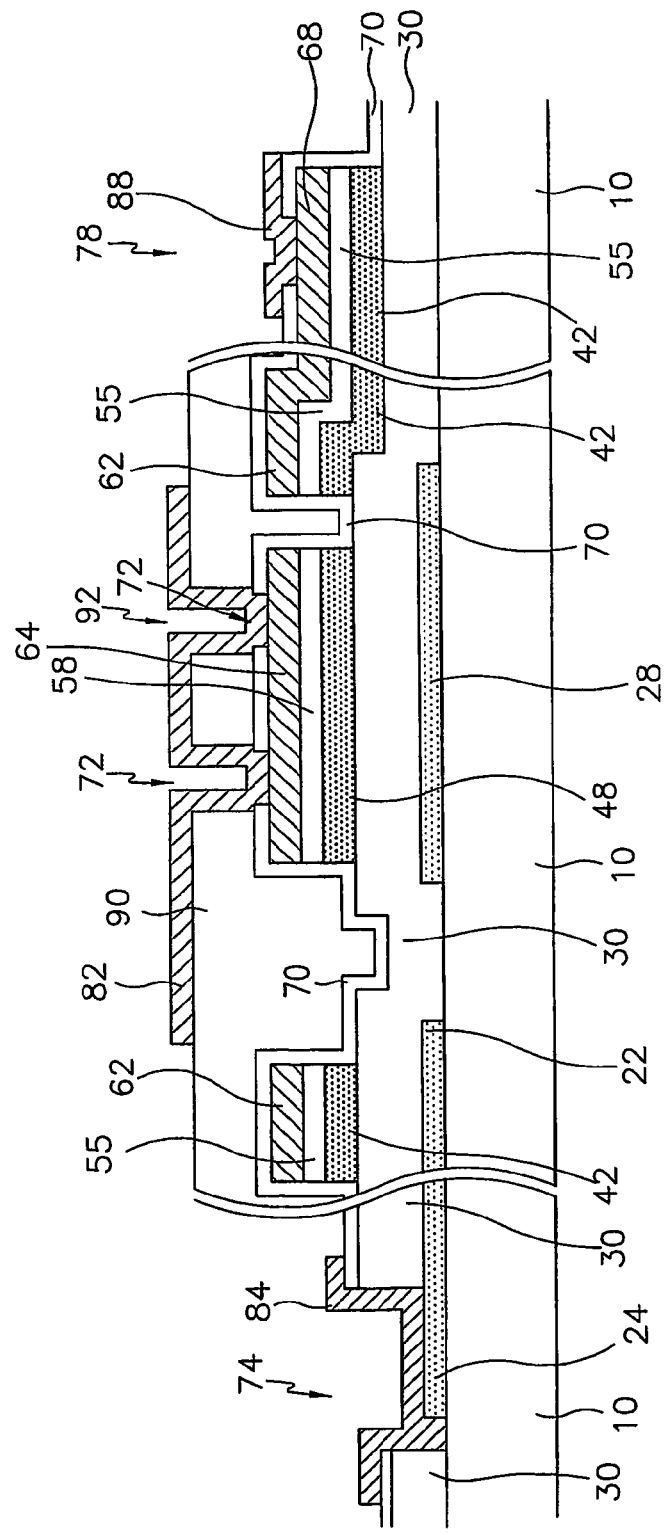
FIGS. 13 and 14 are sectional views of the TFT array panel shown in FIG. 12 taken along the line XIII–XIII' and the line XIV–XIV', respectively.
Figure 14:
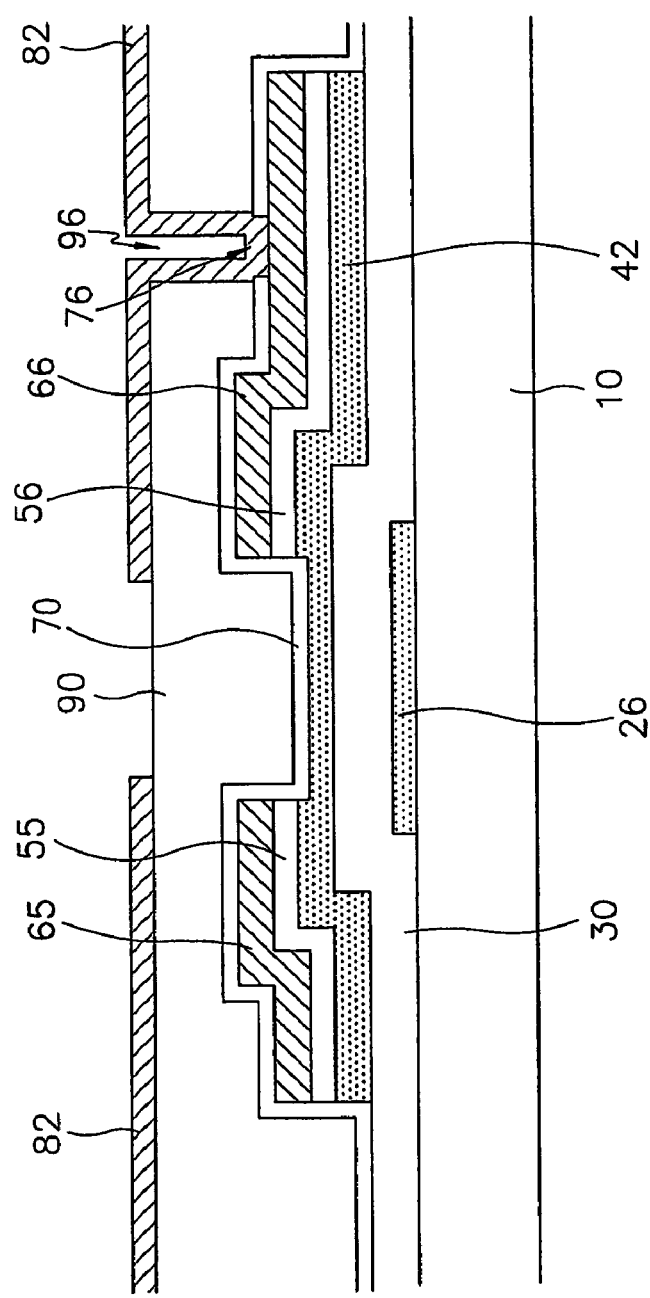

FIG. 12 is a layout view of a TFT array panel for an LCD according to a fourth embodiment of the present invention, and FIGS. 13 and 14 are sectional views of the TFT array panel shown in FIG. 12 taken along the line XIII–XIII' and the line XIV–XIV' of FIG. 12, respectively.

As in the second embodiment, a gate wire is formed on an insulating substrate 10. The gate wire is preferably made of a material with low resistivity such as Ag, Ag alloy, Al and Al alloy. The gate wire includes a plurality of gate lines 22, a plurality of gate pads 24, and a plurality of gate electrodes 26. The gate wire further includes a plurality of storage electrodes 28 formed on the substrate, which are substantially parallel to the gate lines 22 and applied with a predetermined voltage such as a common voltage from an external source, which is also applied to a common electrode of an upper panel. The storage electrodes 28 overlap a storage capacitor conductor pattern connected to pixel electrodes 82, which will be described later, to form storage capacitors for improving the charge storing capacity of pixels. The storage electrodes 28 may be omitted if the storage capacitance due to the overlapping of the gate lines 22 and the pixel electrodes 82 to be described later are sufficient.

A gate insulating layer 30 preferably made of silicon nitride is formed on the gate wire 22, 24, 26 and 28, while covering the gate wire 22, 24, 26 and 28.

A semiconductor pattern 42 and 48 preferably made of hydrogenated amorphous silicon is formed on the gate insulating layer 30, and an ohmic contact layer pattern or an intermediate layer pattern 55, 56 and 58 preferably made of amorphous silicon heavily doped with n type impurity such as phosphorous is formed on the semiconductor layer 42 and 48.

A data wire made of an aluminum-based conductive material with low resistivity is formed on the ohmic contact layer pattern 55, 56 and 58. The data wire includes a plurality of data portions 62, 65 and 68, a plurality of drain electrodes 66 of TFTs, and a storage capacitor conductor pattern 64. Each data portion includes a data line 62 extending substantially in the longitudinal direction, a data pad 68 connected to one end of the data line 62 for receiving image signals from an external device, and a plurality of source electrodes 65 branched from the data line 62. Each drain electrode 66 is separated from the data portion 62, 65 and 68, and placed opposite the corresponding source electrode 53 with respect to the corresponding gate electrode 26 or a channel portion of the associated TFT. The storage capacitor conductor pattern 64 is placed on the storage electrodes 28. In absence of the storage electrodes 28, the storage capacitor conductor pattern 64 is not provided.

The ohmic contact layer pattern 55, 56 and 58 plays a role of reducing the contact resistance between the semiconductor pattern 42 and 48 thereunder and the data wire 62, 64, 65, 66 and 68 thereover. The ohmic contact layer pattern 55, 56 and 58 has substantially the same shape as the data wire 62, 64, 65, 66 and 68. In detail, a data intermediate layer pattern 55 of the have substantially the same shapes as the data portions 62, 65 and 68, a drain intermediate layer pattern 56 as the drain electrodes 66, and a storage capacitor intermediate layer pattern 58 as the storage capacitor conductor pattern 68.

The semiconductor pattern 42 and 48 has the same shape as the data wire 62, 64, 65, 66 and 68 and the ohmic contact layer pattern 55, 56 and 58 except for the channel areas C of the TFTs. Specifically, a storage capacitor semiconductor pattern 48 has substantially the same shape as the storage capacitor conductor pattern 64 and the storage capacitor ohmic contact layer pattern 58, while a TFT semiconductor pattern 42 layer is a little different from the data wire and the rest of the ohmic contact layer pattern. On the channel areas C of each TFT, although the data portions 62, 65 and 68, especially the source electrodes 65 are separated from the drain electrodes 66, and the data intermediate layer pattern 55 is also separated from the drain ohmic contact layer pattern 56, the TFT semiconductor pattern 42 is not disconnected to form channels of the TFTs.

An interlayer insulator including a protective layer 70 preferably made of silicon nitride and an organic insulating layer 90 preferably made of organic insulating material with low permittivity is provided on the data wire 62, 65, 66 and 68 as in the first embodiment. The protective layer 70 has a plurality of contact holes 76, 78 and 72 exposing the drain electrodes 66, the data pads 68, and the storage capacitor conductor pattern 64, respectively, and a plurality of contact holes 74 exposing the gate pads 24 together with the gate insulating layer 30. Like the first embodiment, the organic insulating layer 90 is removed out from the pad areas to expose the protective layer 70, and the contact holes 92 and 96 expose the boundaries of the protective layer 70, which is a lower insulating layer, such that the sidewalls of the contact holes 72, 92; and 76, 96 have stepwise shapes.

A plurality of pixel electrodes 82 receiving image signals from the TFTs and generating electric fields in cooperation with an electrode on an upper panel are formed on the organic insulating layer 90. The pixel electrodes 82 are made of transparent conductive material such as IZO or ITO, and electrically connected to the drain electrodes 66 through the contact holes 76 and 96 to receive image signals. Furthermore, the pixel electrodes 82 overlap the adjacent gate lines 22 and the adjacent data lines 62 to increase the aperture ratio. However, the overlaps may be omitted. The pixel electrodes 82 are connected to the storage capacitor conductor pattern 64 through the contact holes 72 and 92 to transmit the image signals.

A plurality of subsidiary gate pads 84 and a plurality of subsidiary data pads 88 are formed on the protective layer 70. The subsidiary gate pads 84 and the subsidiary data pads 88 are located on the gate pads 24 and the data pads 24 and 68, respectively, and thus connected thereto through the contact holes 74 and 78, respectively. Although the subsidiary gate pads 84 and the subsidiary data pads 88 are not requisites but preferred to protect the pads 24 and 68 and to complement the adhesiveness between the pads 24 and 68 and external circuit devices. The contact structure has no undercut and thus prevents the disconnections of the pixel electrodes 82, the subsidiary gate pads 84, and the subsidiary data pads 88. The subsidiary gate pads 84 and the subsidiary data pads 88 are located on the protective layer 70 at least in part.

Now, a method of manufacturing a TFT array panel for an LCD having the structure shown in FIGS. 12–14 using four masks will be described in detail with reference to FIGS. 12–14 and FIGS. 15A–22C.

Figure 15A:
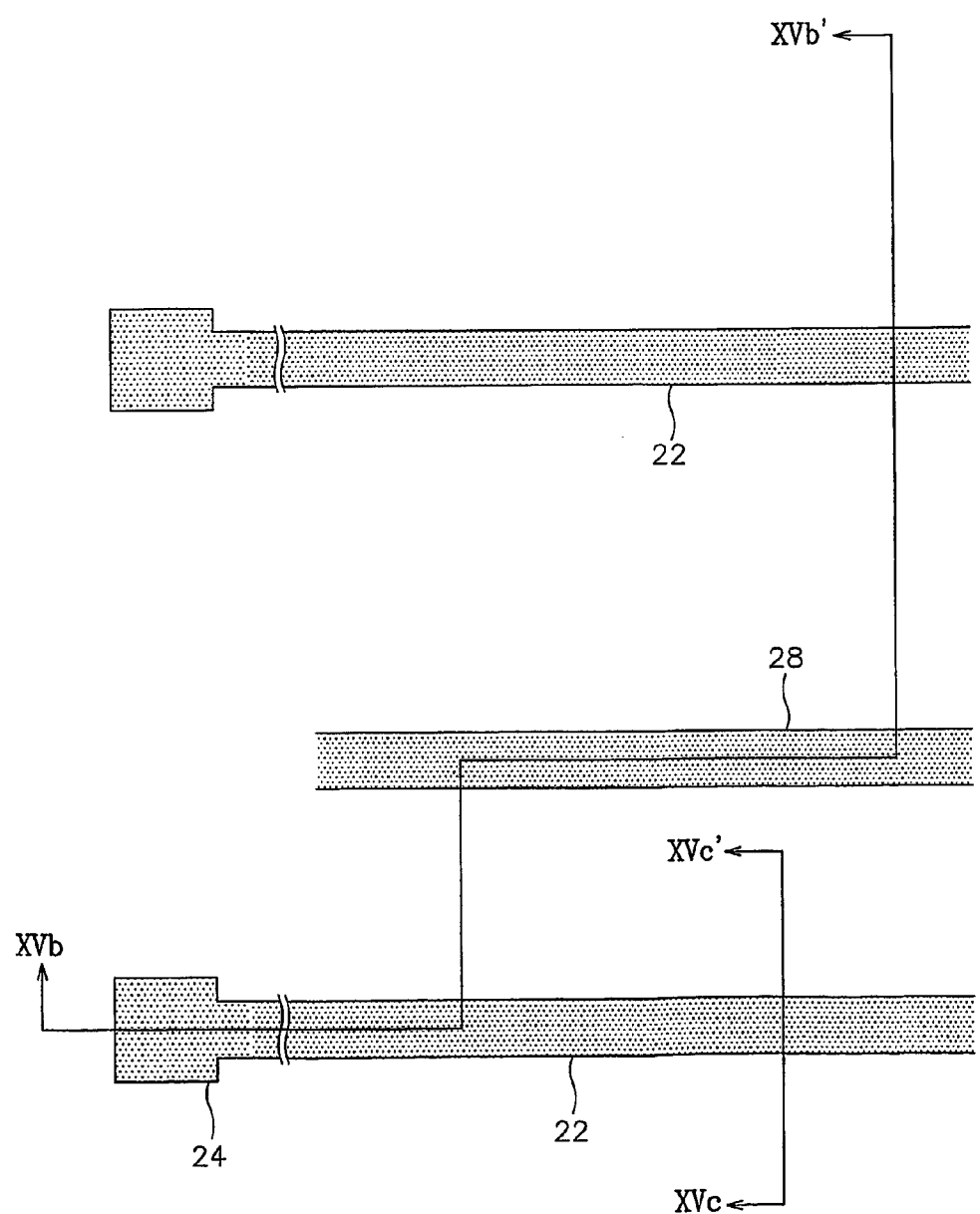
FIG. 15A is a layout view of a TFT array panel in the first step of a manufacturing method thereof according to the third embodiment of the present invention.
Figure 15B:
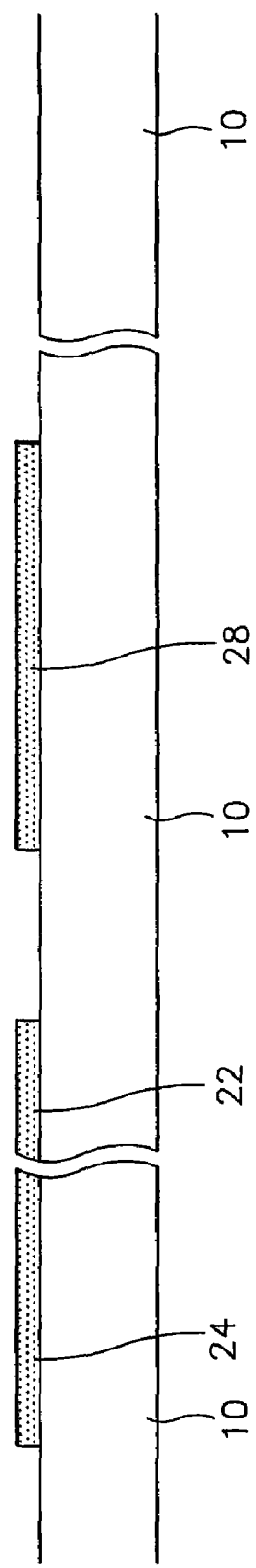
FIGS. 15B and 15C are sectional views of the TFT array panel shown in FIG. 15A taken along the lines XVB–XVB' and XVC–XVC', respectively.
Figure 15C:
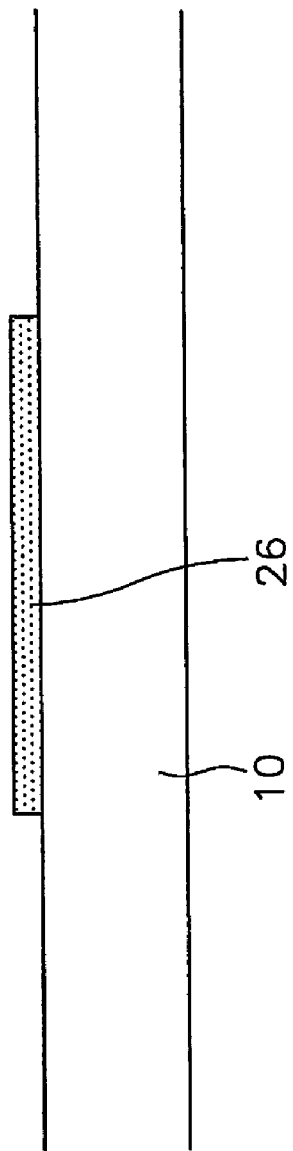

First, as shown in FIGS. 15A–15C, a gate wire including a plurality of gate lines 22, a plurality of gate pads 24, a plurality of gate electrodes 26, and a plurality of storage electrodes 28 is formed on a substrate 10 by depositing a conductive material or materials for the gate wire and patterning by photo etch using a first mask. The gate wire has a single-layered structure including a single layer made of material with low resistivity such as Al, Al alloy, Ag or Ag alloy. Alternatively, the conductive layer has a multiple-layered structure including the single layer and a layer made of conductive material with good contact characteristics with other materials, such as Cr, Ti, and Ta.

Figure 16A:
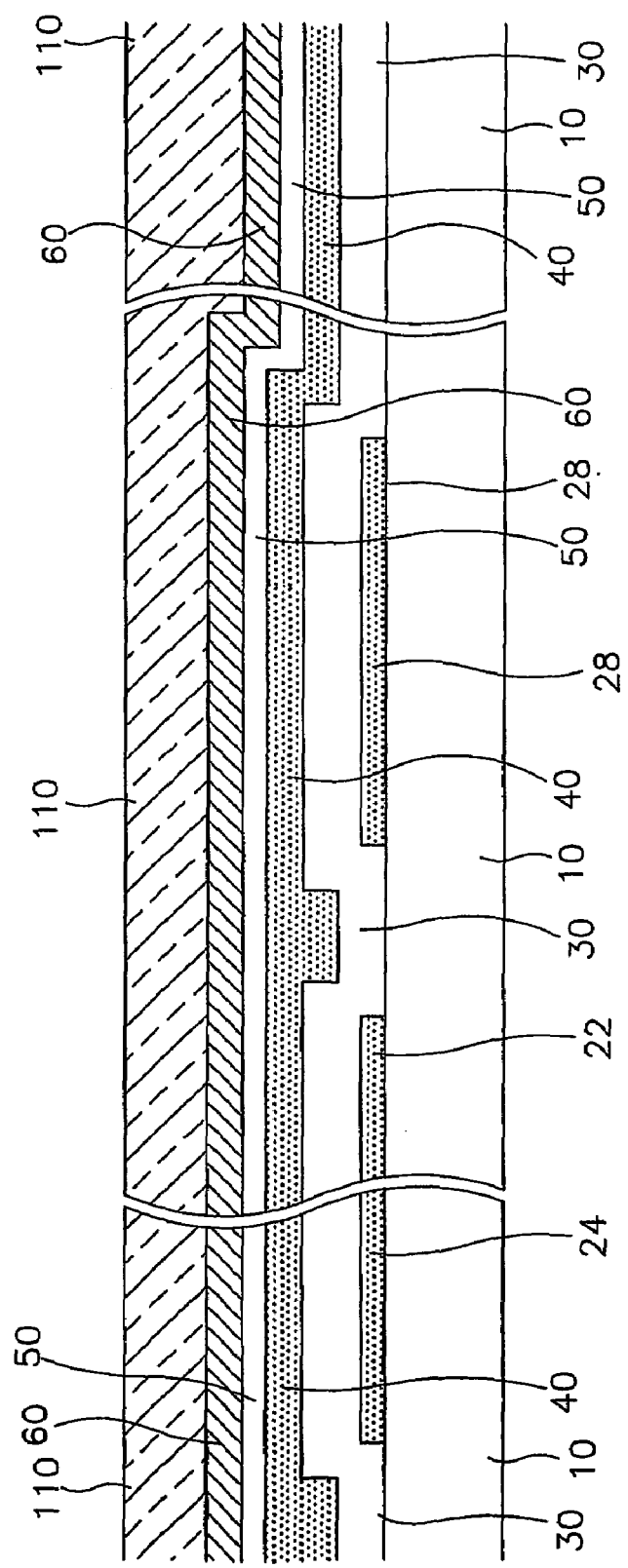
FIGS. 16A and 16B are sectional views of the TFT array panel shown in FIG. 15A taken along the lines XVB–XVB' and XVC–XVC', respectively, and illustrate the step following the step shown in FIGS. 15B and 15C.
Figure 16B:
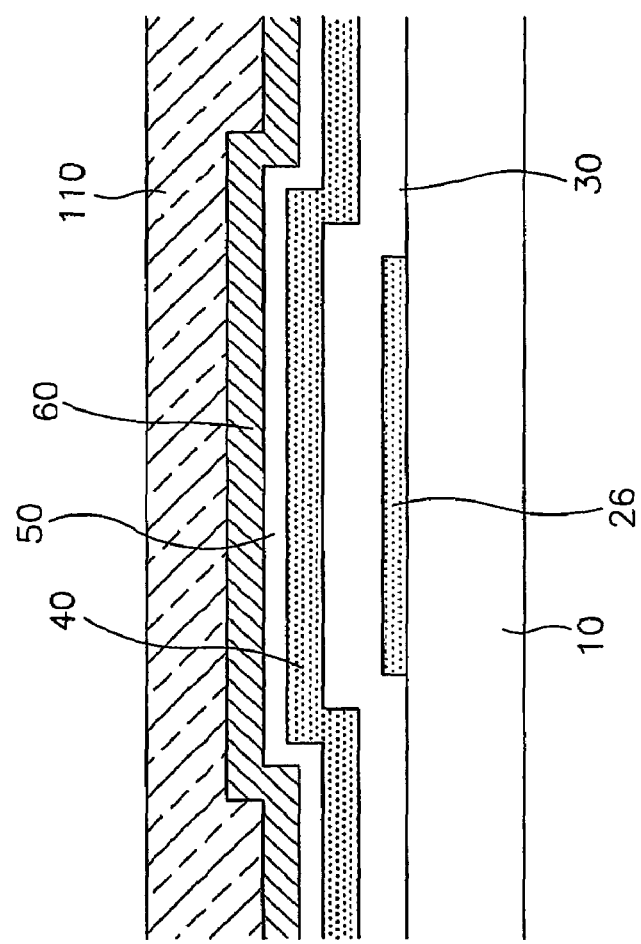

Next, as shown in FIGS. 16A and 16B, a gate insulating layer 30, a semiconductor layer 40, and an intermediate layer 50 are sequentially deposited by CVD such that the layers 30, 40 and 50 bear thickness of 1,500–5,000 Å, 500–2,000 Å and 300–600 Å, respectively. A conductive layer 60 for a data wire with low resistivity is deposited by sputtering such that the layer 60 bears the thickness of 1,500–3,000 Å, and subsequently a photoresist film 110 with the thickness of 1–2 microns is coated on the conductive layer 60.

Figure 17A:
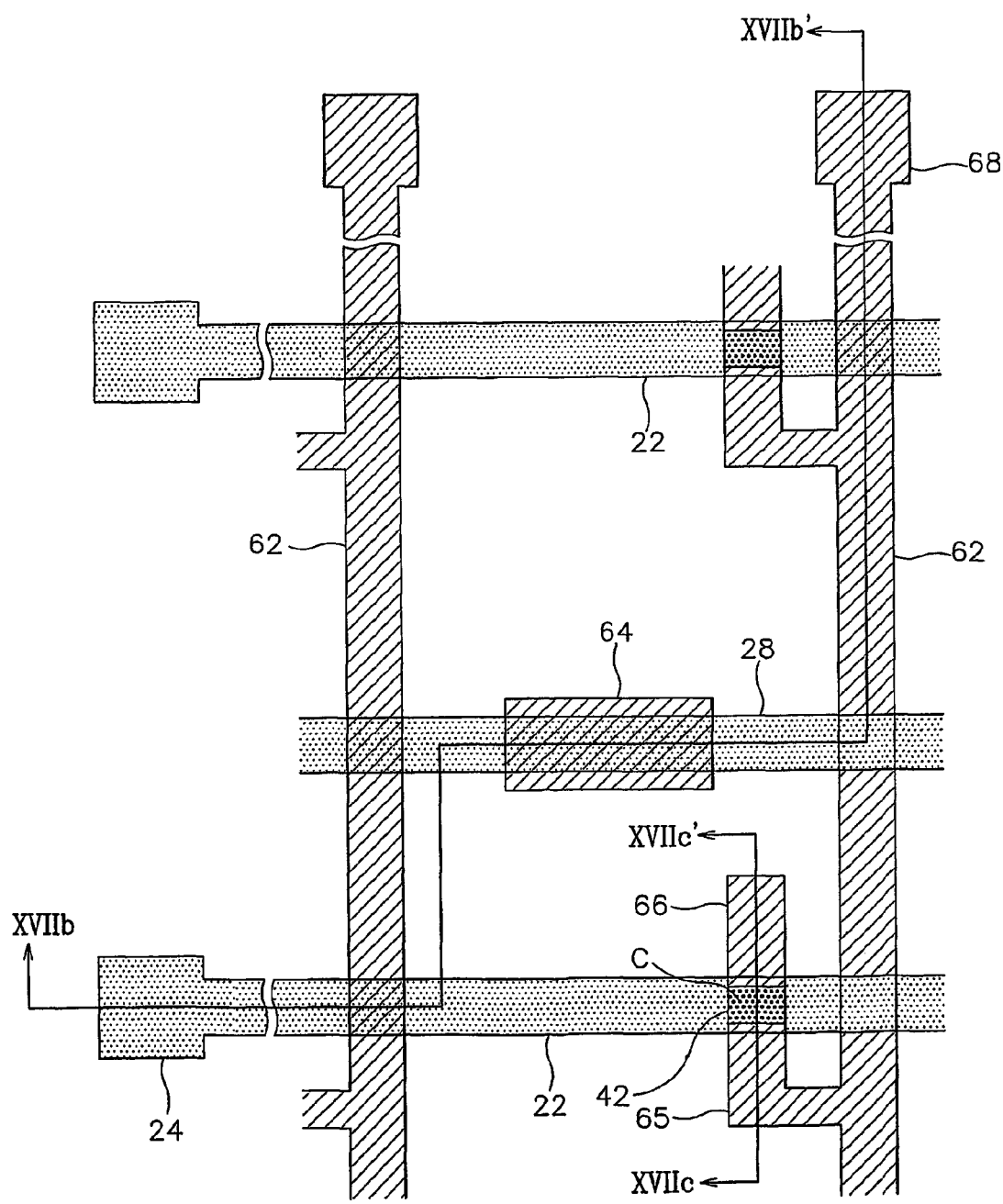
FIG. 17A is a layout view of the TFT array panel in the step following the step shown in FIGS. 16A and 16B.
Figure 17B:
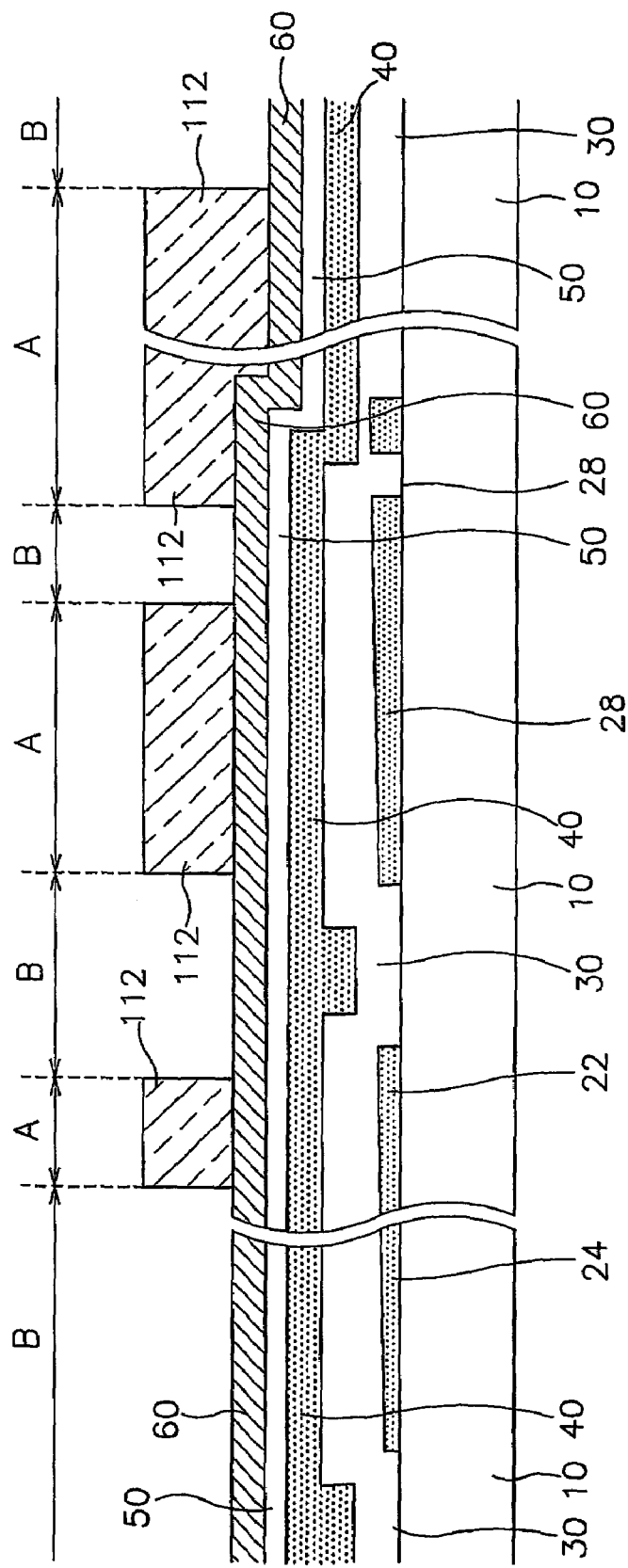
FIGS. 17B and 17C are sectional views of the TFT array panel shown in FIG. 17A taken along the lines XVIIB–XVIIB' and XVIIC–XVIIC', respectively.
Figure 17C:
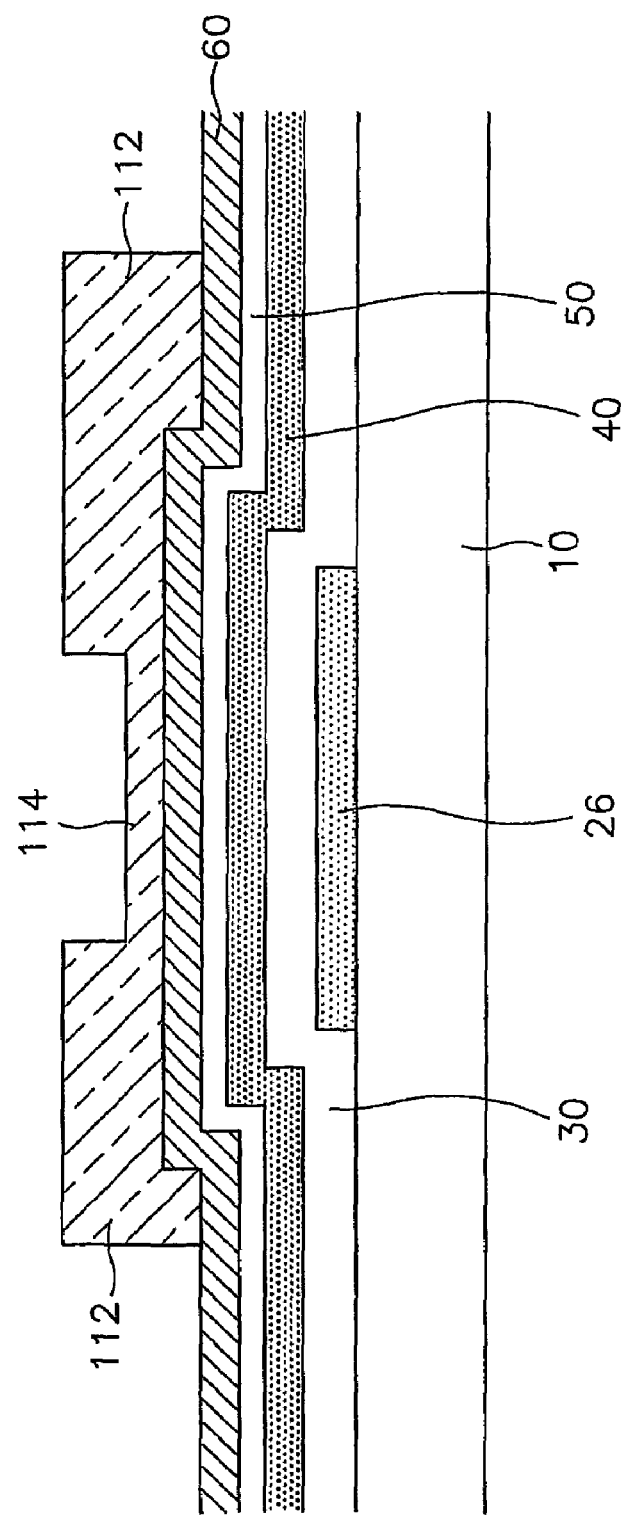

Subsequently, the photoresist film 110 is exposed to light through a second mask, and developed to form a photoresist pattern 114 and 112 as shown in FIGS. 17A–17C. First portions 114 of the photoresist pattern 114 and 112, which are located on channel areas C of TFTs between source and drain electrodes 65 and 66, are established to bear thickness smaller than that of the second portions 112 on data areas A where the data wire 62, 64, 65, 66 and 68 is formed. The portions of the photoresist film on the remaining area B are removed. The thickness ratio of the first portions 114 on the channel areas C to the second portions 112 on the data areas A is adjusted depending upon the etching conditions in the etching steps to be described later. It is preferable that the thickness of the first portions 114 is equal to or less than half of the thickness of the second portions 112, in particular, equal to or less than 4,000 Å.

The position-dependent thickness of the photoresist film is obtained by several techniques. In order to adjust the amount of light exposure in the areas C, semi-transparent areas having a slit pattern, a lattice pattern or semi-transparent films are provided on a mask.

When using a slit pattern, it is preferable that the width of the portions between the slits or the distance between the portions, i.e., the width of the slits is smaller than the resolution of an exposer used for the photolithography. In case of using semi-transparent films, thin films with different transmittances or with different thicknesses may be used to adjust the transmittance of the mask.

When the photoresistive film is irradiated with light through such a mask, polymers of the portions directly exposed to the light are almost completely decomposed, and those of the portions facing the slit pattern or the semi-transparent films are not completely decomposed due to the small amount of light exposure. The polymers of the portions blocked by light-blocking films are hardly decomposed. Development of the photoresistive film makes the portions having the polymers, which are not decomposed, to be left, and makes the portions exposed to the smaller light irradiation to be thinner than the portions which do not experience the light exposure. Here, it is required not to make the exposure time long enough to decompose all the molecules.

The thin portions 114 of the photoresist pattern may be obtained by performing a reflow process to flow a reflowable photoresist film into the areas without the photoresist film after exposing to light and developing the photoresist film, using a usual mask with transmissive areas completely transmitting the light and blocking areas completely blocking the light.

Thereafter, the photoresist pattern 114 and the underlying layers, i.e., the conductive layer 60, the intermediate layer 50 and the semiconductor layer 40 are etched such that a data wire and the underlying layers are left over on the data areas A, only the semiconductor layer is left over on the channel areas C, and all of the three layers 60, 50 and 40 are removed from the remaining areas B to expose the gate insulating layer 30.

Figure 18A:
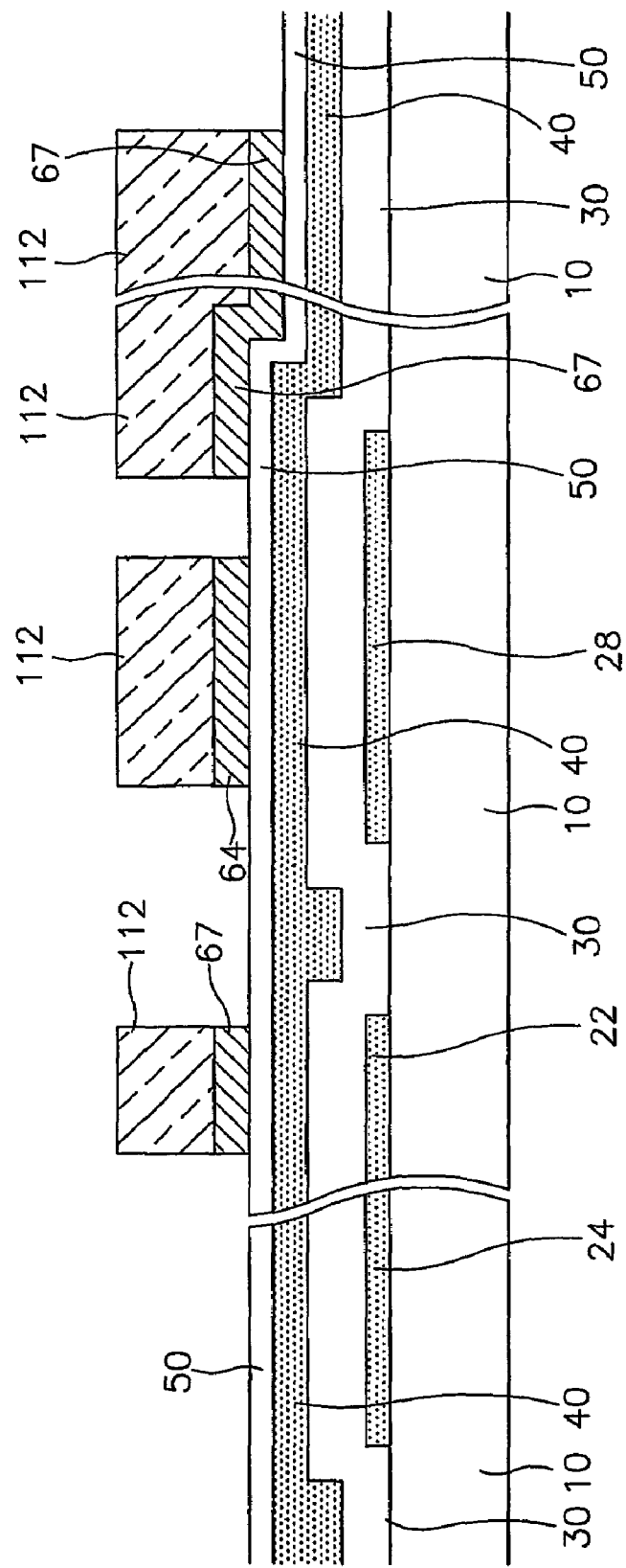
Figure 18B:
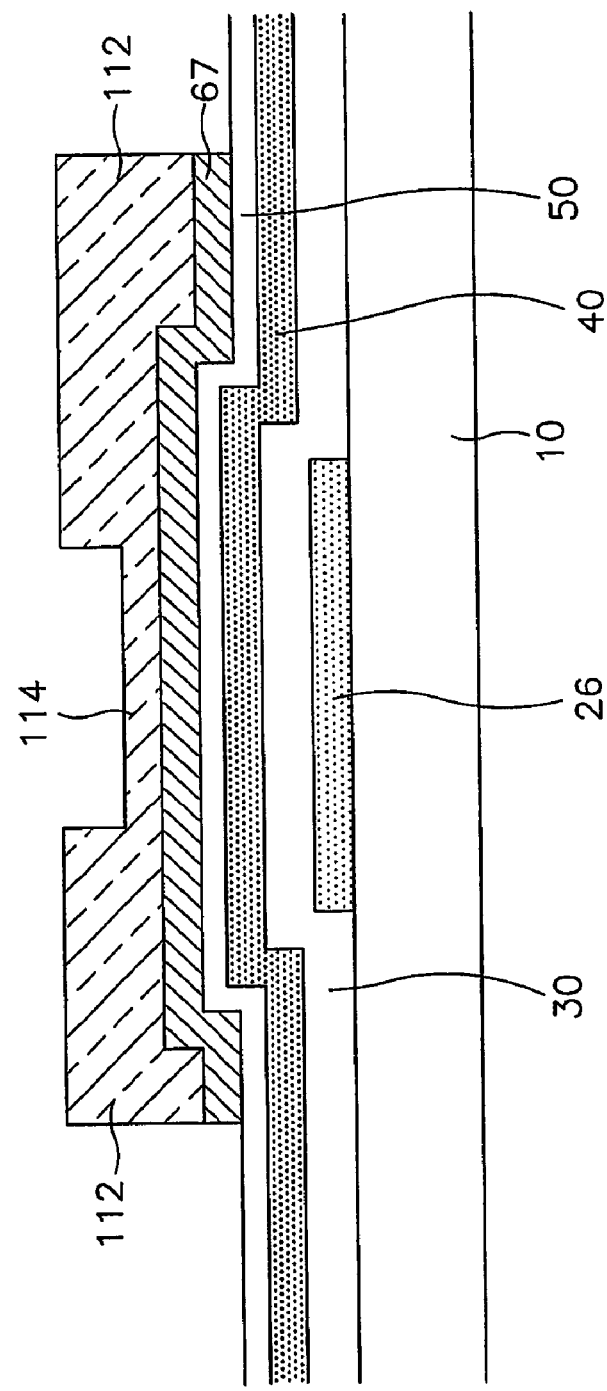

As shown in FIGS. 18A and 18B, the exposed portions of the conductive layer 60 on the areas B are removed to expose the underlying portions of the intermediate layer 50. In this step, both dry etching and wet etching is selectively used and preferably performed under the condition that the conductive layer 60 is selectively etched while the photoresist pattern 112 and 114 is hardly etched. However, an etching condition capable of etching the photoresist pattern 112 and 114 as well as the conductive layer 60 would be suitable for dry etching since it is difficult to find a condition for selectively etching only the conductive layer 60 while not etching the photoresist pattern 112 and 114. In this case, the first portion 114 should have relatively thick compared with that for wet etching in order to prevent the exposure of the underlying conductive layer 60 through the etching.

Both dry etching and wet etching are applicable to the conductive material for a data wire containing Al or Al alloy. Wet etching, preferably with an etchant CeNHO3, is preferred for Cr which is hardly removed by dry etching. However, a very thin Cr film of about 500 Å may be removed by dry etching.

Consequently, as shown in FIGS. 18A and 18B, a source/drain conductor pattern 67, i.e., portions of the conductive layer on the channel areas C and the data areas A, and a storage capacitor conductor pattern 64 are left over, while portions of the conductive layer 60 on the remaining areas B is removed out to expose the underlying portions of the intermediate layer 50. The remaining conductor patterns 67 and 64 have substantially the same shapes as the data wire 62, 64, 65, 66 and 68 except that the source and the drain electrodes 65 and 66 are still connected without separation.

When using the dry etching, the photoresist pattern 112 and 114 are also etched to a predetermined thickness.

Figure 19A:
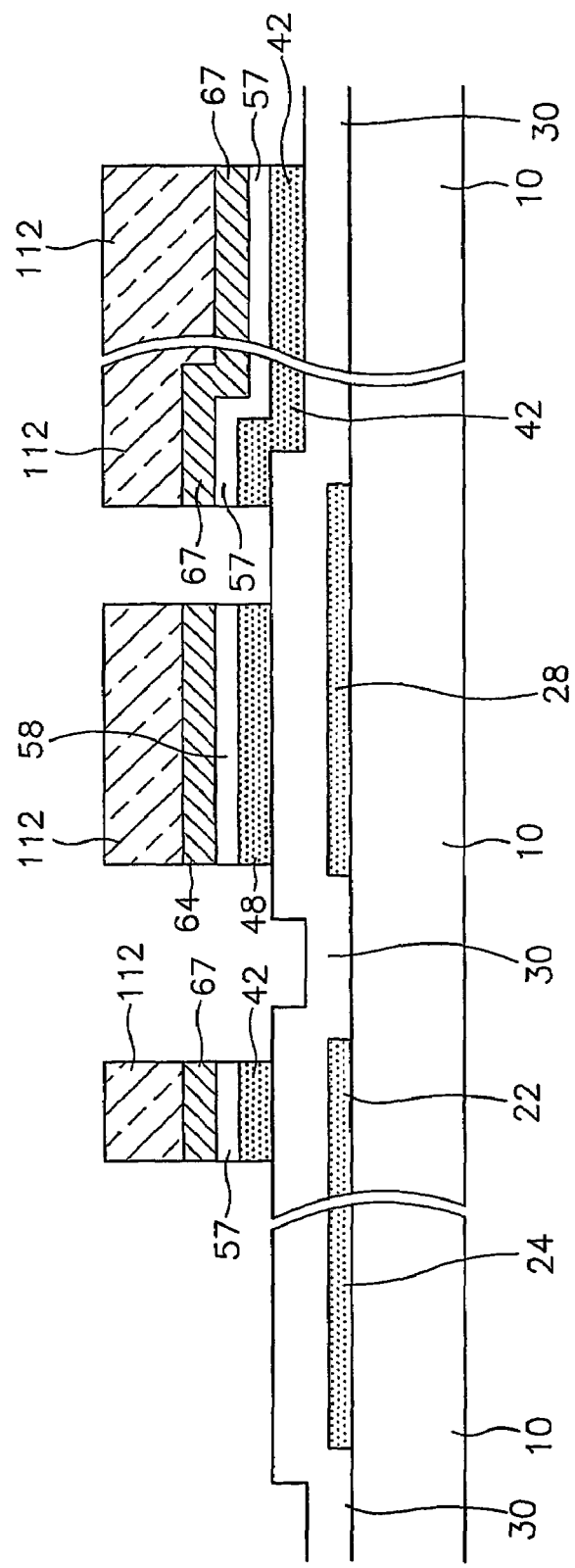
Figure 19B:
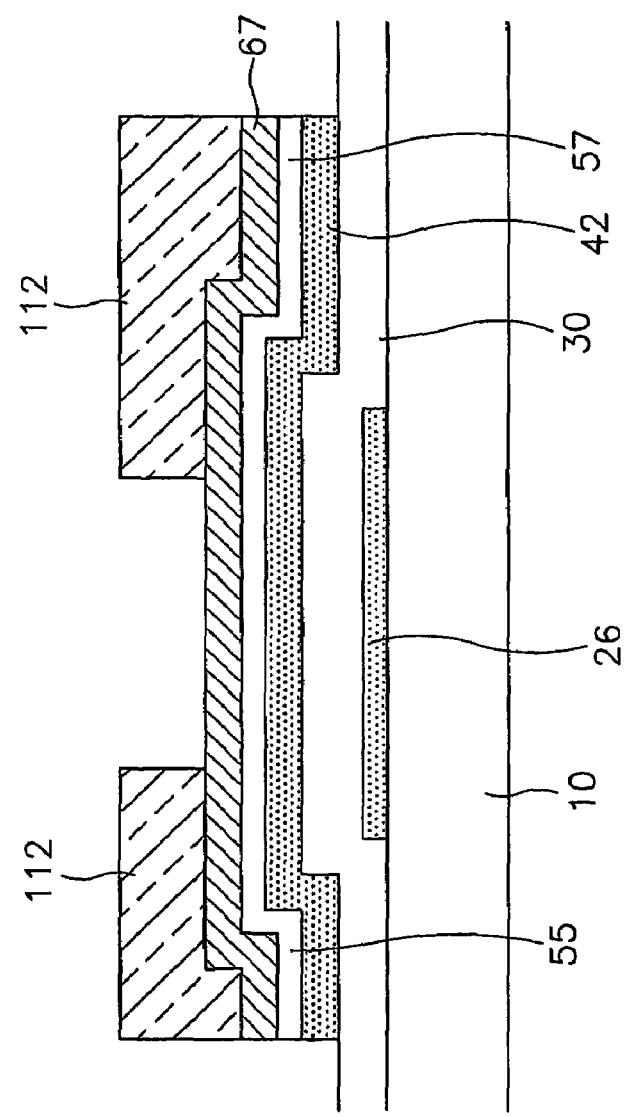

Next, as shown in FIGS. 19A and 19B, the exposed portions of the intermediate layer 50 on the areas B and the underlying portions of the semiconductor layer 40 are simultaneously removed by dry etching together with the first portions 114 of the photoresist pattern. Sequential dry etch of the intermediate layer 50 and the semiconductor layer 40 may follow the dry etch of the conductor patterns 64 and 67 or in-situ etch process may be performed. The etch of the intermediate layer 50 and the semiconductor layer 40 is preferably made in a condition that the photoresist pattern 112 and 114, the intermediate layer 50 and the semiconductor layer 40 are simultaneously etched while the gate insulating layer 30 is not etched. (It is noted that the semiconductor layer and the intermediate layer have no etching selectivity.) Particularly, the etching ratios of the photoresist pattern 112 and 114 and the semiconductor layer 40 are preferably equal to each other. For the equal etching ratios of the photoresist pattern 112 and 114 and the semiconductor layer 40, the thickness of the first portions 114 is preferably equal to or less than the sum of the thicknesses of the semiconductor layer 40 and the intermediate layer 50.

In this way, as shown in FIGS. 19A and 19B, the portions of the conductive layer 60 on the channel areas C and the data areas A, i.e., the source/drain conductor pattern 67 and the storage capacitor conductor pattern 64 are left over, while the portions of the conductive layer 60 on the remaining areas B are removed out. Moreover, the first portions 114 on the channel areas C are removed to expose the source/drain conductor pattern 67, and the portions of the intermediate layer 50 and the semiconductor layer 40 on the areas B are removed to expose the underlying portions of the gate insulating layer 30. Meanwhile, the second portions 112 on the data areas A are also etched to have reduced thickness. In this step, the formation of a semiconductor pattern 42 and 48 are completed. Reference numerals 57 and 58 indicate intermediate layer patterns under the source/drain conductor pattern 67 and under the storage capacitor conductor pattern 64, respectively. The exposure of the portions of the source/drain conductor pattern 67 on the channel areas C is alternatively obtained by a separate photoresist ("PR") etch back step, which is not necessary under the condition that the photoresist film is sufficiently etched.

Residual photoresist remained on the surface of the source/drain conductor pattern 67 on the channel areas C is then removed by ashing.

Figure 20A:
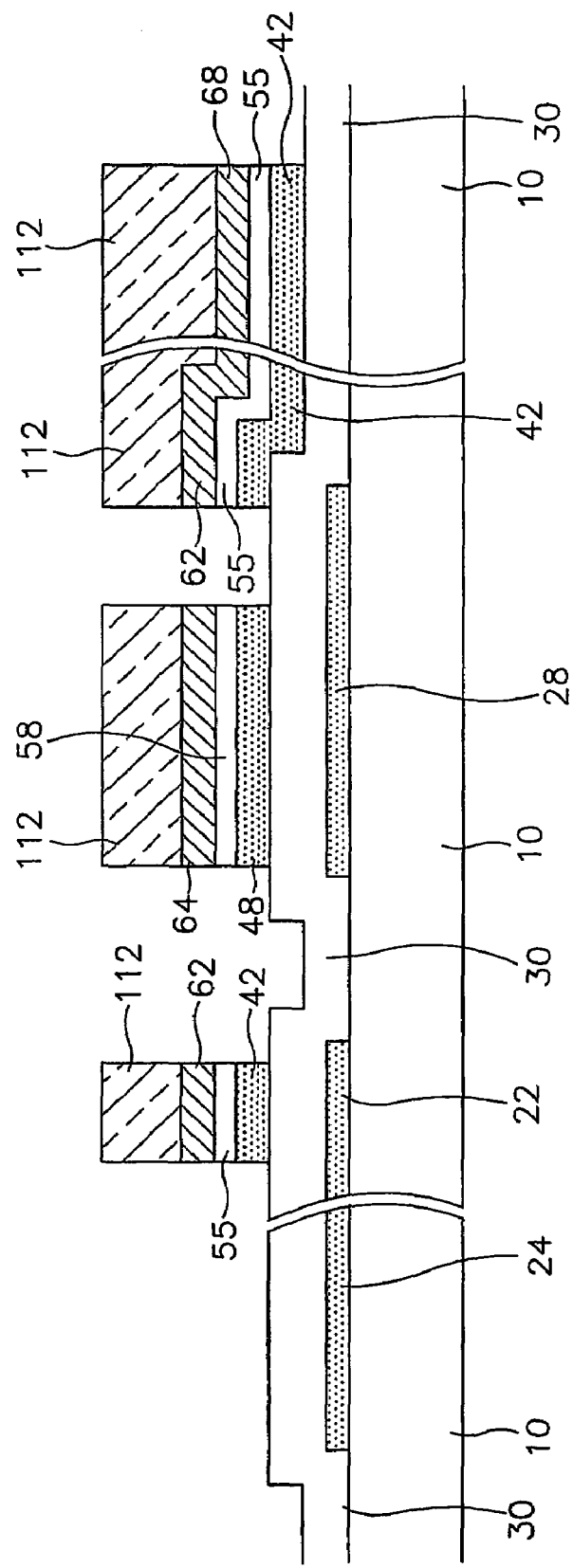

Subsequently, as shown in FIGS. 20A and 20B, the exposed portions of the source/drain conductor pattern 67 on the channel areas C and the underlying portions of the source/drain intermediate layer pattern 57 are etched to be removed. Dry etching may be applied to both of the source/drain conductor pattern 67 and the source/drain intermediate layer pattern 57. Alternatively, wet etching is applied to the source/drain conductor pattern 67 while dry etching is applied to the source/drain intermediate layer pattern 57. At this time, as shown in FIG. 15B, top portions of the semiconductor pattern 42 may be removed to cause thickness reduction, and the second portions 112 of the photoresist pattern is etched to a predetermined thickness. The etching is performed under the condition that the gate insulating layer 30 is hardly etched, and it is preferable that the photoresist film is so thick to prevent the second portion 112 from being etched to expose the underlying data wire 62, 64, 65, 66 and 68.

In this way, the source and the drain electrodes 65 and 66 are separated from each other while completing the formation of the data wire 62, 64, 65, 66 and 68 and the underlying ohmic contact layer pattern 55, 56 and 58.

Finally, the second portions 112 remained on the data areas A are removed. However, the removal of the second portions 112 may be made between the removal of the portions of the source/drain conductor pattern 67 on the channel areas C and the removal of the underlying portions of the intermediate layer pattern 57.

Figure 21A:
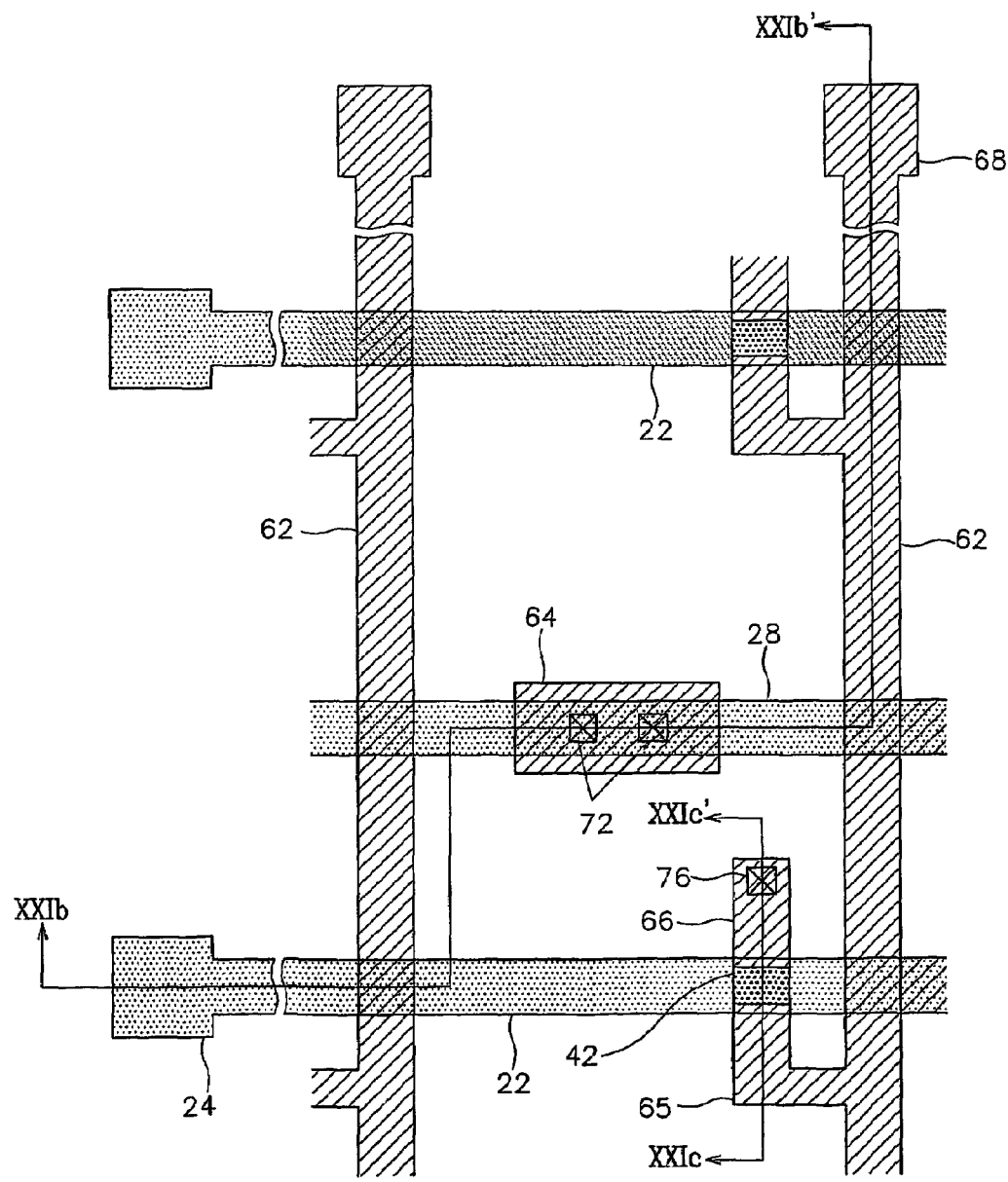
FIG. 21A is a layout view of the TFT array panel in the step following the step shown in FIGS. 20A and 20B.
Figure 21B:
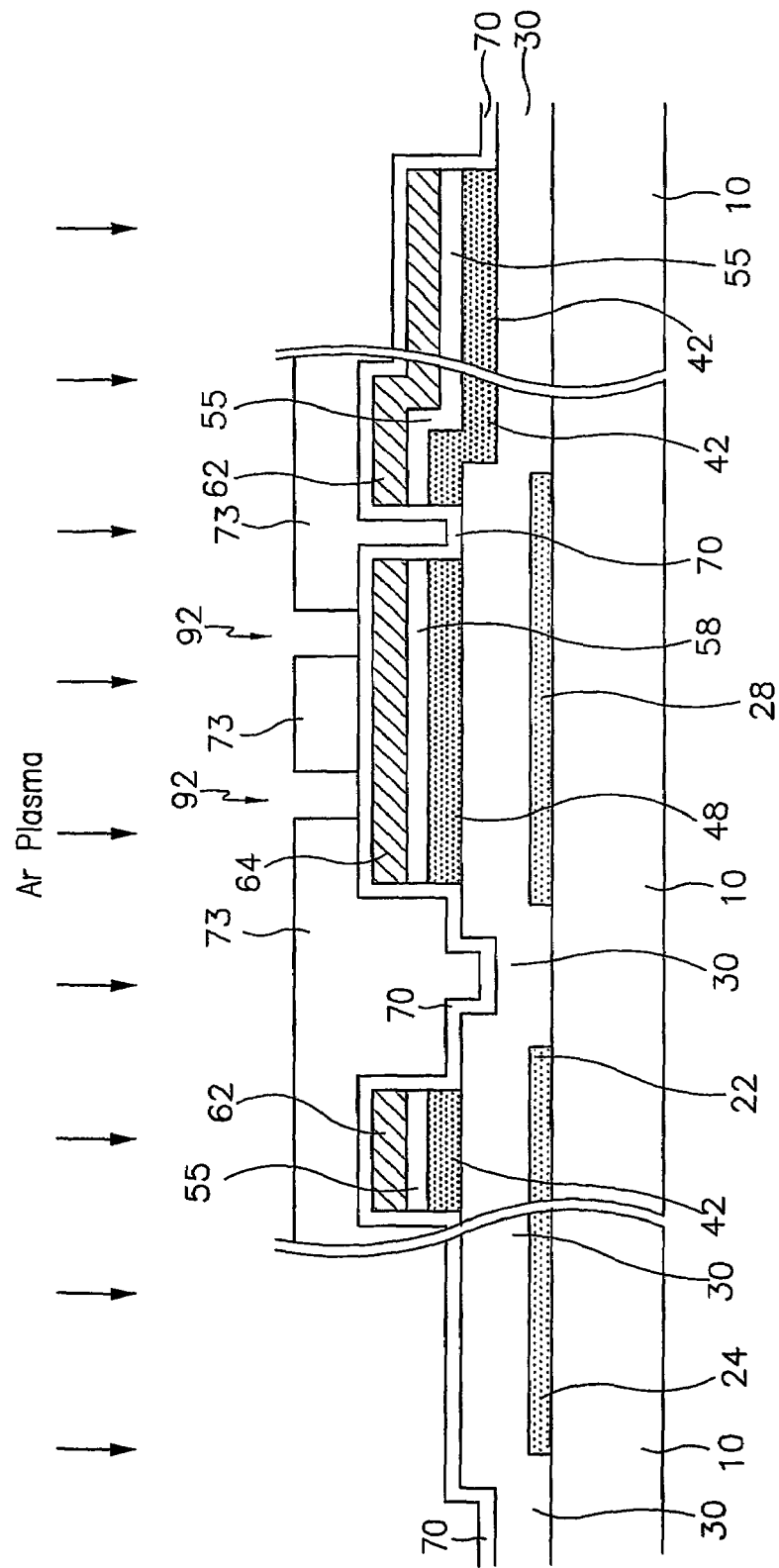

After the data wire 62, 64, 65, 66 and 68 is formed as described above, silicon nitride is deposited by CVD to form a protective layer 70 as shown in FIGS. 21A–21C. An organic insulating layer 90 is formed on the protective layer 70 by spin-coating photosensitive organic material having a good flatness characteristic and low permittivity before patterning the protective layer 70. The spin-coating of the organic insulating layer 90 before patterning the protective layer 70 according to this embodiment of the present invention prevents the localized distribution of the organic insulating layer 90 onto a specific area because there is no height difference due to the protective layer 70 during the spin coating. Thereafter, the organic insulating layer 90 is patterned by photolithography using a mask to form a plurality of contact holes 96 and 92 exposing portions of the protective layer 70 on the drain electrodes 66 and the storage capacitor conductor pattern 64. At this time, the portions the organic insulating layer 90 at the pad areas with the gate pads 24 or the data pads 68 are removed to expose the protective layer 70.

Subsequently, as shown in FIGS. 21B and 21C, the plasma process using inactive gas such as Ar is performed to enhance the surface roughness of the organic insulating layer 90. As a result, a contact area between the pixel electrode 82, which will be formed later, and the organic insulating layer 90 is increased to ensure the adhesiveness therebetween. The plasma process performed before patterning the protective layer 70 may prevent the organic material from remaining directly on the signal wires 66, 64, 24 and 68.

Figure 22A:
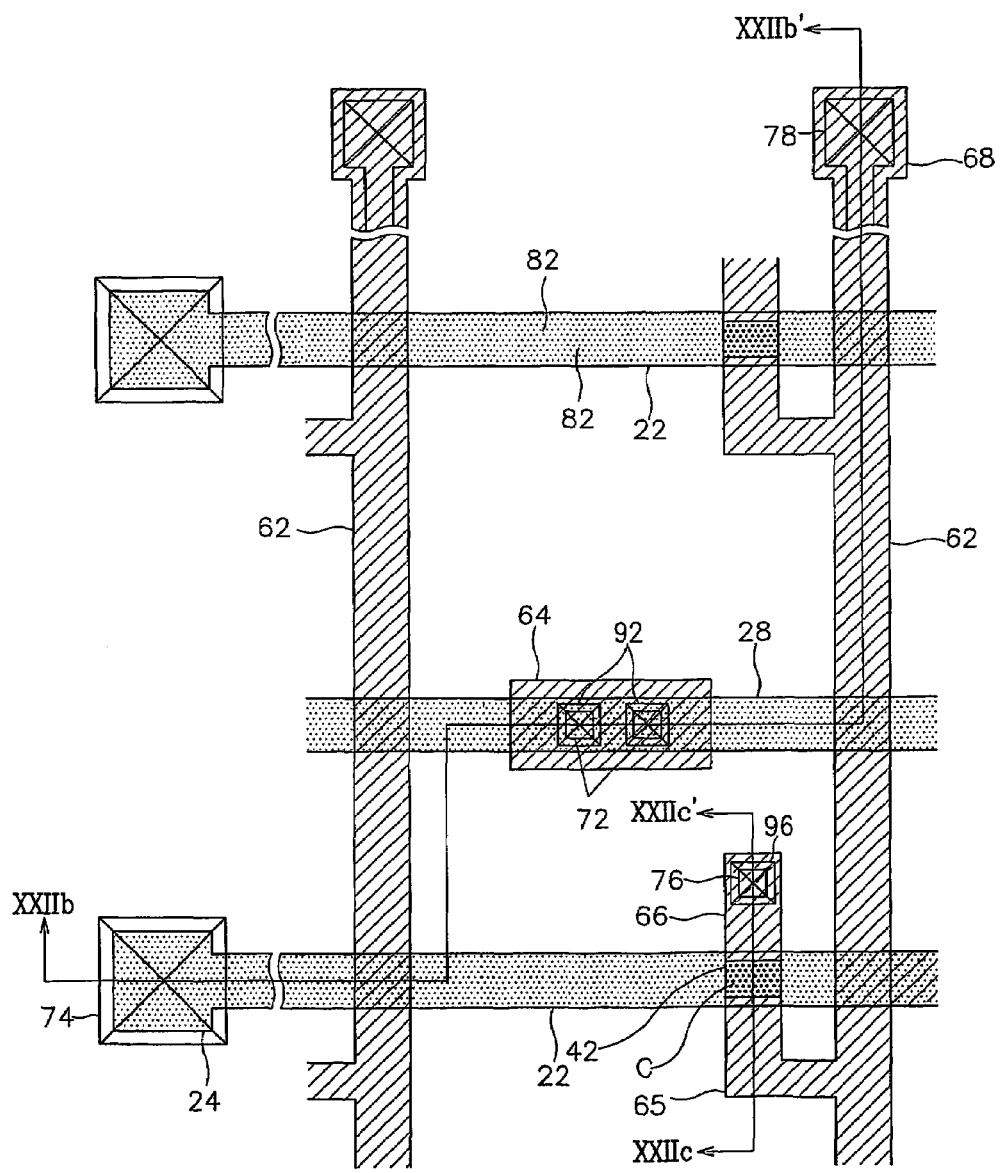
FIG. 22A is a layout view of the TFT array panel in the step following the step shown in FIGS. 21B and 21C.
Figure 22B:
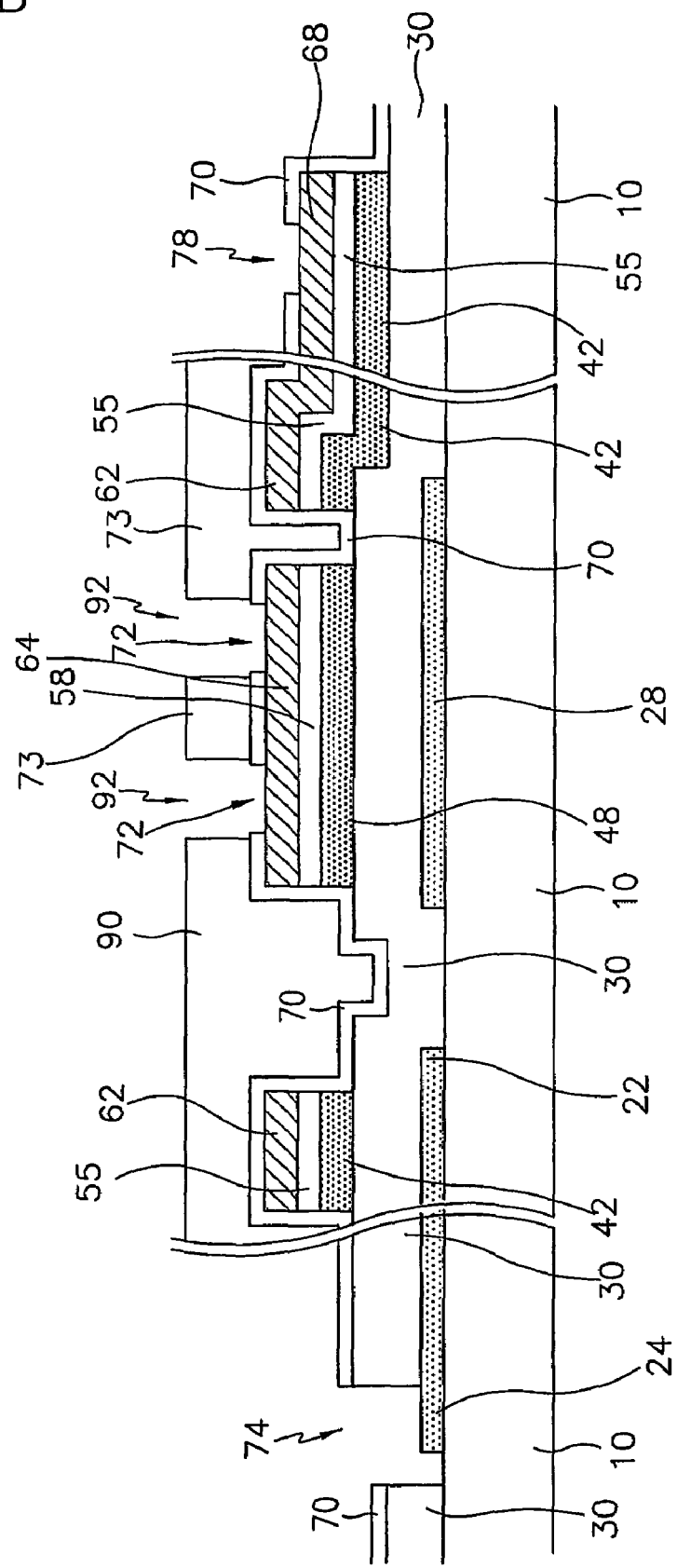
FIGS. 22B and 22C are sectional views of the TFT array panel shown in FIG. 22A taken along the lines XXIB–XXIIB' and XXIIC–XXIIC' and illustrate the sequence of the step following the step shown in FIGS. 21B and 21C, respectively.
Figure 22C:
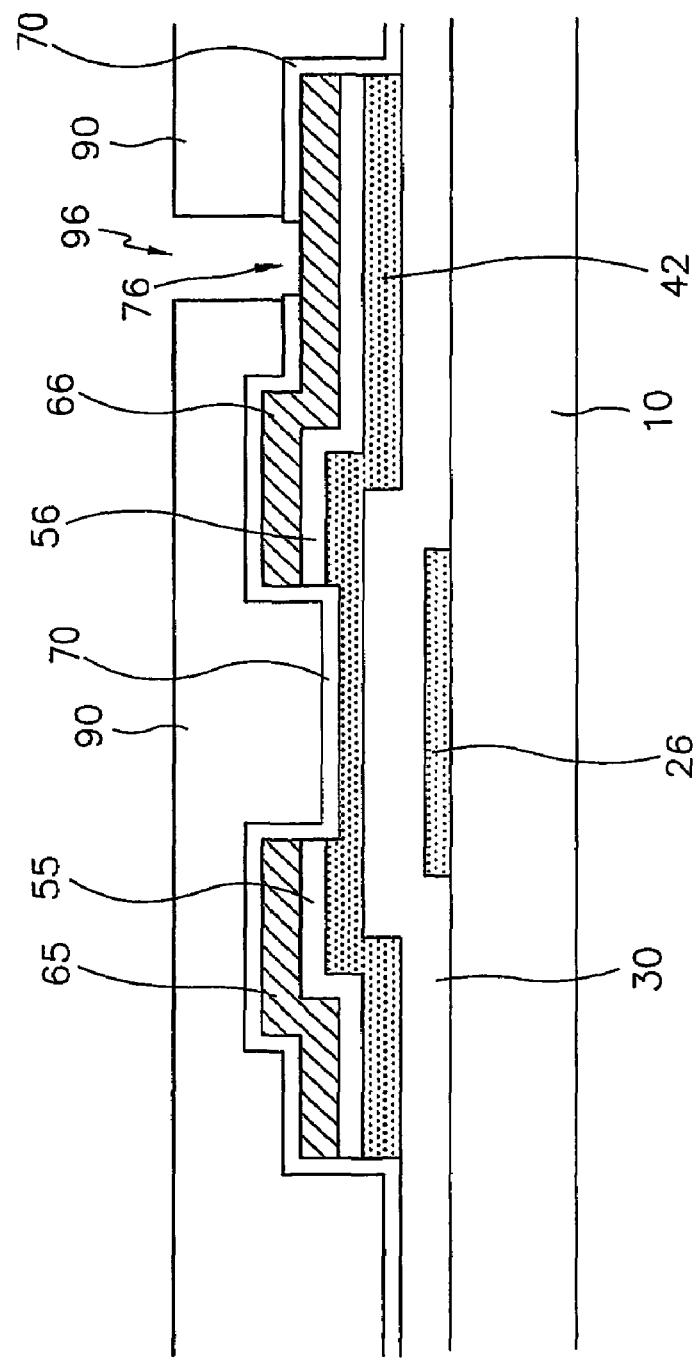

Referring to FIGS. 22A to 22C, as in the first embodiment, the protective layer 70 as well as the gate insulating layer 30 is patterned by photo etch using a photoresist pattern to form a plurality of contact holes 74, 76, 72 and 78 exposing the gate pads 24, the drain electrodes 66, the storage capacitor conductor pattern 64 and the data pads 68, respectively. The contact holes 76 and 72 of the protective layer 70 exposing the drain electrodes 66 and the storage capacitor conductor pattern 64 are placed inside the contact holes 96 and 92 of the organic insulating layer 90.

According to manufacturing methods of the embodiments of the present invention, although the organic material is re-deposited to remain on the exposed portions of the protective layer 70 by the previous plasma process, the organic material remnants at contacts including the contact holes 74, 76, 72 and 78 is almost removed in the pattering step of the protective layer 70 for forming the contact holes 74, 76, 72 and 78. Furthermore, since the protective layer 90 is patterned after performing the plasma process, remaining gas used in the plasma process is almost removed.

When the data wire 62, 64, 65, 66 and 68 or the gate wire 22, 24, 26 and 28 have multiple layers and the top layer of the data wire 62, 65, 66 and 68 or the gate wire 22, 24 and 26 is formed of Al or Al alloy, the top layer is removed to prevent the top layer of Al or Al alloy from contacting an ITO film, which will be formed later, at a contact.

Finally, after removing the photoresist pattern, as shown in FIGS. 12 to 14 like the first and the second embodiments of the present invention, ITO or IZO with a thickness of 400–500 Å is deposited and etched using a fourth mask to form a plurality of pixel electrodes 82 connected to the drain electrodes 66 and the storage capacitor conductor pattern 64, a plurality of subsidiary gate pads 84 connected to the gate pads 24, and a plurality of subsidiary data pads 84 and 88 connected to the data pads 68.

The third embodiment of the present invention provides not only the advantages according to the first embodiment ensuring the adhesiveness between the organic insulating layer 90 and the pixel electrode 82 and minimizing the contact resistance at a contact but also a simplified process that the data wire 62, 64, 65, 66 and 68, the ohmic contact layer pattern 55, 56 and 58 and the semiconductor pattern 42 and 48 thereunder are formed using one mask, and simultaneously, the source and the drain electrodes 65 and 66 are separated from each other in this step.

The connection between driving ICs and pads of a TFT array panel for an LCD manufactured by these methods is implemented by using TCPs with driving ICs mounted on respective films or by means of the COP style. Alternatively, the electrical connection therebetween is obtained by means of the above described COG style which directly mounts driving ICs on a panel.

Although the first to third embodiments of the present invention illustrate manufacturing methods of TFT array panels having semiconductor patterns made of amorphous silicon, the present invention may be applied to a manufacturing method of a TFT array panel having the semiconductor pattern made of polysilicon.

In this way, under the condition that a wire is covered with a protective layer, the surface of an organic insulating layer is treated by the plasma process and then the protective layer is patterned to form a contact exposing the wire. Therefore, it prevents the gases for the plasma process or organic materials from being remained at the contact. Accordingly, the present invention ensures the adhesiveness between the organic insulating layer and the pixel electrode and minimizes the contact resistance at a contact.

What is claimed is:

1. A method of manufacturing a thin film transistor array panel for a liquid crystal display, the method comprising:

forming a gate wire including a gate line and a gate electrode connected to the gate line;

depositing a gate insulating layer;

forming a semiconductor layer;

forming a data wire including a data line intersecting the gate lines to define a pixel area, a source electrode connected to the data line and placed close to the gate electrode, and a drain electrode placed opposite the source electrode with respect to the gate electrodes;

depositing a protective layer covering the gate wire or the data wire;

forming an organic insulating layer by spin-coating an organic insulating material on the protective layer;

patterning the organic insulating layer to form a first contact hole exposing the protective layer opposite the drain electrode;

surface-treating the organic insulating layer by a plasma process using inactive gas;

patterning the protective layer to form a second contact hole exposing the drain electrode and located inside the first contact hole; and, forming a pixel electrode electrically connected to the drain electrode through the first and the second contact holes.

2. The method of claim 1, wherein the pixel electrode comprises a transparent conductive electrode or a reflective conductive film.

3. The method of claim 2, wherein a surface of the organic insulating layer has an unevenness pattern when the pixel electrode has the reflective film.

4. The method of claim 2, wherein the reflective film has an aperture in the pixel area when the pixel electrode comprises both the transparent electrode and the reflective film.

5. The method of claim 1, wherein the semiconductor layer comprises amorphous silicon or polysilicon.

6. The method of claim 1, wherein the gate wire further includes a gate pad connected to one end of the gate line, the data wire further includes a data pad connected to one end of the data line, and the protective layer or the gate insulating layer has a third contact hole exposing the gate pad or the data pad, and wherein the thin film transistor array panel further comprises a subsidiary pad electrically connected to the gate pad or the data pad through the third contact hole and including substantially the same layer as the pixel electrode.

7. The method of claim 1, wherein both the data wire and the semiconductor layer are formed by a photo etch step using a photoresist pattern with position-dependent thickness.

* * * * *